United States Patent
Sawa et al.

(10) Patent No.: US 12,221,097 B2
(45) Date of Patent: Feb. 11, 2025

(54) VEHICLE CONTROL SYSTEM, VEHICLE INTEGRATED CONTROL DEVICE, ELECTRONIC CONTROL DEVICE, NETWORK COMMUNICATION DEVICE, VEHICLE CONTROL METHOD AND COMPUTER READABLE MEDIUM

(71) Applicant: Mitsubishi Electric Corporation, Tokyo (JP)

(72) Inventors: Kentaro Sawa, Tokyo (JP); Hajime Hasegawa, Tokyo (JP); Takahisa Yamauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 218 days.

(21) Appl. No.: 17/954,495

(22) Filed: Sep. 28, 2022

(65) Prior Publication Data
US 2023/0020415 A1    Jan. 19, 2023

Related U.S. Application Data

(63) Continuation of application No. PCT/JP2020/020304, filed on May 22, 2020.

(51) Int. Cl.
*B60W 30/095*    (2012.01)
*B60R 16/023*    (2006.01)
(Continued)

(52) U.S. Cl.
CPC ..... *B60W 30/0956* (2013.01); *B60R 16/0232* (2013.01); *B60W 50/0097* (2013.01);
(Continued)

(58) Field of Classification Search
CPC ......... B60W 30/0956; B60W 50/0097; B60W 50/0205; B60W 2554/404; B60W 2556/40; B60R 16/0232; G08G 1/16
(Continued)

(56) References Cited

U.S. PATENT DOCUMENTS 9,975,550 B2 *   5/2018  Katoh ............... B60W 30/0953
10,860,023 B2 * 12/2020  Di Cairano ....... B60W 30/0956
(Continued)

FOREIGN PATENT DOCUMENTS

CN            116552514 A  *  8/2023  ............ B60W 30/09
DE    10 2018 217 403 A1       4/2020
(Continued)

OTHER PUBLICATIONS

German Office Action for German Application No. 11 2020 006 919.2, dated Apr. 24, 2023, with English translation.
(Continued)

*Primary Examiner* — Atul Trivedi
(74) *Attorney, Agent, or Firm* — Birch, Stewart, Kolasch & Birch, LLP

(57) ABSTRACT

A vehicle control system (500) controls a vehicle whereon a plurality of ECUs (30) and a vehicle integrated control device (10) to control the plurality of ECUs (30) are mounted. The vehicle integrated control device (10) includes a control target value operation unit to calculate a control target value to control the plurality of ECUs (30). Further, the vehicle integrated control device (10) includes a prediction control value operation unit to estimate a state of the vehicle in the future, and to calculate a prediction control value to control the plurality of ECUs (30). The vehicle integrated control device (10) includes an instruction signal generation unit to generate an instruction signal including an operation instruction and a prediction control instruction. Each of the plurality of ECUs (30) includes an actuator control unit to control an actuator (50) based on the prediction control instruction.

15 Claims, 21 Drawing Sheets

(51) Int. Cl.
  *B60W 50/00* (2006.01)
  *B60W 50/02* (2012.01)
  *G08G 1/16* (2006.01)

(52) U.S. Cl.
  CPC ... *B60W 50/0205* (2013.01); *B60W 2554/404* (2020.02); *B60W 2556/40* (2020.02); *G08G 1/16* (2013.01)

(58) Field of Classification Search
  USPC .......................................................... 701/26
  See application file for complete search history.

(56) References Cited

U.S. PATENT DOCUMENTS

| | | | |
|---|---|---|---|
| 11,195,418 B1* | 12/2021 | Hong | B60W 30/18159 |
| 12,112,279 B2* | 10/2024 | Hayashi | G06N 7/01 |
| 2006/0015231 A1 | 1/2006 | Yoshimura et al. | |
| 2010/0030421 A1 | 2/2010 | Yoshimura et al. | |
| 2014/0188343 A1 | 7/2014 | Yoshimura et al. | |
| 2015/0100207 A1 | 4/2015 | Yoshimura et al. | |
| 2018/0292834 A1* | 10/2018 | Kindo | G01C 21/3415 |
| 2018/0335774 A1* | 11/2018 | Sato | B60W 50/0098 |
| 2018/0348769 A1* | 12/2018 | Sato | B60W 30/02 |
| 2019/0061743 A1* | 2/2019 | Ozawa | B60W 20/15 |
| 2019/0152348 A1 | 5/2019 | Ishida | |
| 2019/0220011 A1* | 7/2019 | Della Penna | G07C 5/0841 |
| 2020/0047753 A1 | 2/2020 | Kato et al. | |
| 2020/0086837 A1 | 3/2020 | Le Cornec | |
| 2020/0133281 A1 | 4/2020 | Gomez Gutierrez et al. | |
| 2020/0148200 A1* | 5/2020 | Lerner | G08G 1/162 |
| 2020/0148214 A1* | 5/2020 | Tamagaki | B60R 21/00 |
| 2020/0346641 A1* | 11/2020 | Woon | G06V 20/58 |
| 2020/0346643 A1* | 11/2020 | Woon | B60W 60/00276 |
| 2021/0092025 A1 | 3/2021 | Ukai et al. | |
| 2021/0129834 A1* | 5/2021 | Gier | B60W 30/0956 |
| 2021/0146803 A1* | 5/2021 | Wu | B60N 2/002 |
| 2021/0197848 A1* | 7/2021 | Kilaru | G06N 7/01 |
| 2021/0197858 A1* | 7/2021 | Zhang | G08G 1/161 |
| 2021/0253128 A1* | 8/2021 | Nister | B60W 60/0027 |
| 2022/0041159 A1* | 2/2022 | Kim | G08G 1/16 |
| 2022/0048525 A1* | 2/2022 | Tsai | B60W 50/0098 |
| 2022/0176992 A1* | 6/2022 | Nemoto | B60W 50/029 |
| 2022/0242413 A1* | 8/2022 | Jing | G05D 1/0231 |
| 2022/0402485 A1* | 12/2022 | Kobilarov | B60W 30/0956 |
| 2023/0037767 A1* | 2/2023 | Yang | G08G 1/167 |
| 2023/0102844 A1* | 3/2023 | Kim | B60W 50/0097 701/26 |
| 2023/0394823 A1* | 12/2023 | Weng | B60W 60/00276 |
| 2024/0051553 A1* | 2/2024 | Leitch | G01S 13/931 |
| 2024/0083426 A1* | 3/2024 | Okamoto | G08G 1/09 |
| 2024/0092390 A1* | 3/2024 | Philion | G06N 3/006 |
| 2024/0101150 A1* | 3/2024 | Pronovost | G06N 3/08 |
| 2024/0140413 A1* | 5/2024 | Kim | B60W 30/0956 |
| 2024/0140414 A1* | 5/2024 | Kim | B60W 10/18 |
| 2024/0149868 A1* | 5/2024 | Packer | G08G 1/161 |
| 2024/0174239 A1* | 5/2024 | Narayanan | B60W 60/001 |
| 2024/0308540 A1* | 9/2024 | Cui | B60W 60/001 |

FOREIGN PATENT DOCUMENTS

| | | | | |
|---|---|---|---|---|
| DE | 102020100685 A1 * | 9/2020 | | B60W 30/09 |
| FR | 3 086 073 A1 | 3/2020 | | |
| JP | 11-334559 A | 12/1999 | | |
| JP | 2002-48606 A | 2/2002 | | |
| JP | 2009-227278 A | 10/2009 | | |
| JP | 2012-214123 A | 11/2012 | | |
| JP | 2019-93894 A | 6/2019 | | |
| JP | 2019-216348 A | 12/2019 | | |
| JP | 7222420 B2 * | 2/2023 | | |
| WO | WO 2018/073886 A1 | 4/2018 | | |

OTHER PUBLICATIONS

International Search Report (PCT/ISA/210), issued in PCT/JP2020/020304, dated Aug. 18, 2020.

Written Opinion of the International Searching Authority (PCT/ISA/237), issued in PCT/JP2020/020304, dated Aug. 18, 2020.

* cited by examiner

VEHICLE CONTROL SYSTEM, VEHICLE INTEGRATED CONTROL DEVICE, ELECTRONIC CONTROL DEVICE, NETWORK COMMUNICATION DEVICE, VEHICLE CONTROL METHOD AND COMPUTER READABLE MEDIUM

CROSS REFERENCE TO RELATED APPLICATIONS

This application is a Continuation of PCT International Application No. PCT/JP2020/020304, filed on May 22, 2020, which is hereby expressly incorporated by reference into the present application.

TECHNICAL FIELD

The present invention relates to a vehicle control system, a vehicle integrated control device, an electronic control device, a network communication device, a vehicle control method and a vehicle control program.

BACKGROUND ART

Conventionally, as a means to control braking, a driving force and a steering angle of a vehicle, there has been a vehicle integrated control device to perform control by one electronic control device intensively. The vehicle integrated control device calculates a control value of a vehicle from information such as a state of the vehicle and a traffic environment of the surroundings, etc. Then, the vehicle integrated control device controls an actuator connected to the electronic control device by transmitting a control instruction to the electronic control device to make the vehicle operate. The electronic control device is called an ECU (an electronic control unit).

Meanwhile, in a case wherein an abnormality occurs in the vehicle integrated control device to perform intensive control, there is a possibility that a large part of vehicle control may be lost, and a significant accident may be caused. Therefore, in a vehicle control system including the vehicle integrated control device, reliability that the operation of the vehicle is continued without losing functions related to braking, driving and steering of a vehicle is requested even when an abnormality occurs in the vehicle integrated control device.

Conventionally, as a highly reliable vehicle control system, it has been known a system wherein a vehicle integrated control device is configured in a physically redundant manner. Further, it has been known a system wherein reliability is enhanced by installing all functions or a part of the functions of the vehicle integrated control device on another ECU.

Patent Literature 1 discloses a vehicle control device to perform braking, driving and steering of a vehicle. In a case wherein a failure is detected inside a node by a failure detection function, this vehicle control device continues a normal operation as an entire system by switching control to a normal node other than the node that is faulty.

CITATION LIST

Patent Literature

Patent Literature 1: JP 2009-227276 A

SUMMARY OF INVENTION

Technical Problem

Patent Literature 1 discloses that an actuator controller is switched to generate a control target value in a case wherein a master computer to generate a control target value is faulty. The master computer corresponds to a vehicle integrated control device. Further, the actuator controller corresponds to an ECU. However, in the configuration of Patent Literature 1, it is necessary for the ECU to perform sophisticated arithmetic processing to calculate the control target value in addition to processing to control an actuator; hence, there is a problem that the ECU is required to have a high level of operation performance.

The present invention is aimed at making it possible to continue an operation in a case wherein an abnormality occurs in a vehicle integrated control device without addition of sophisticated arithmetic processing to an ECU.

Solution to Problem

There is provided according to one aspect of the present invention a vehicle control system of a vehicle whereon a plurality of electronic control devices to each control an actuator, and a vehicle integrated control device to control the plurality of electronic control devices are mounted, wherein
the vehicle integrated control device includes:
a control target value operation unit to calculate a control target value to control the plurality of electronic control devices based on a present state of the vehicle, and on a target trajectory generated based on a scheduled travelling route of the vehicle;
a prediction control value operation unit to estimate a state of the vehicle in a future, and calculates a prediction control value to control the plurality of electronic control devices based on the state of the vehicle estimated and the target trajectory; and
an instruction signal generation unit to acquire the control target value and the prediction control value, generate an operation instruction to be transmitted to each of the plurality of electronic control devices based on the control target value, generate a prediction control instruction to be transmitted to each of the plurality of electronic control devices based on the prediction control value, and generate an instruction signal including the operation instruction and the prediction control instruction, and wherein
each of the plurality of electronic control devices includes an actuator control unit to control the actuator based on the prediction control instruction.

Advantageous Effects of Invention

In the vehicle control system according to the present invention, a prediction control value for controlling an electronic control device is calculated. Additionally, the electronic control device is capable of controlling an actuator by a prediction control instruction based on the prediction control value. Therefore, by the vehicle control system according to the present invention, it is possible to continue an operation in a case wherein an abnormality occurs in a vehicle integrated control device without addition of sophisticated arithmetic processing to the electronic control device.

DESCRIPTION OF EMBODIMENTS

Figure 1:
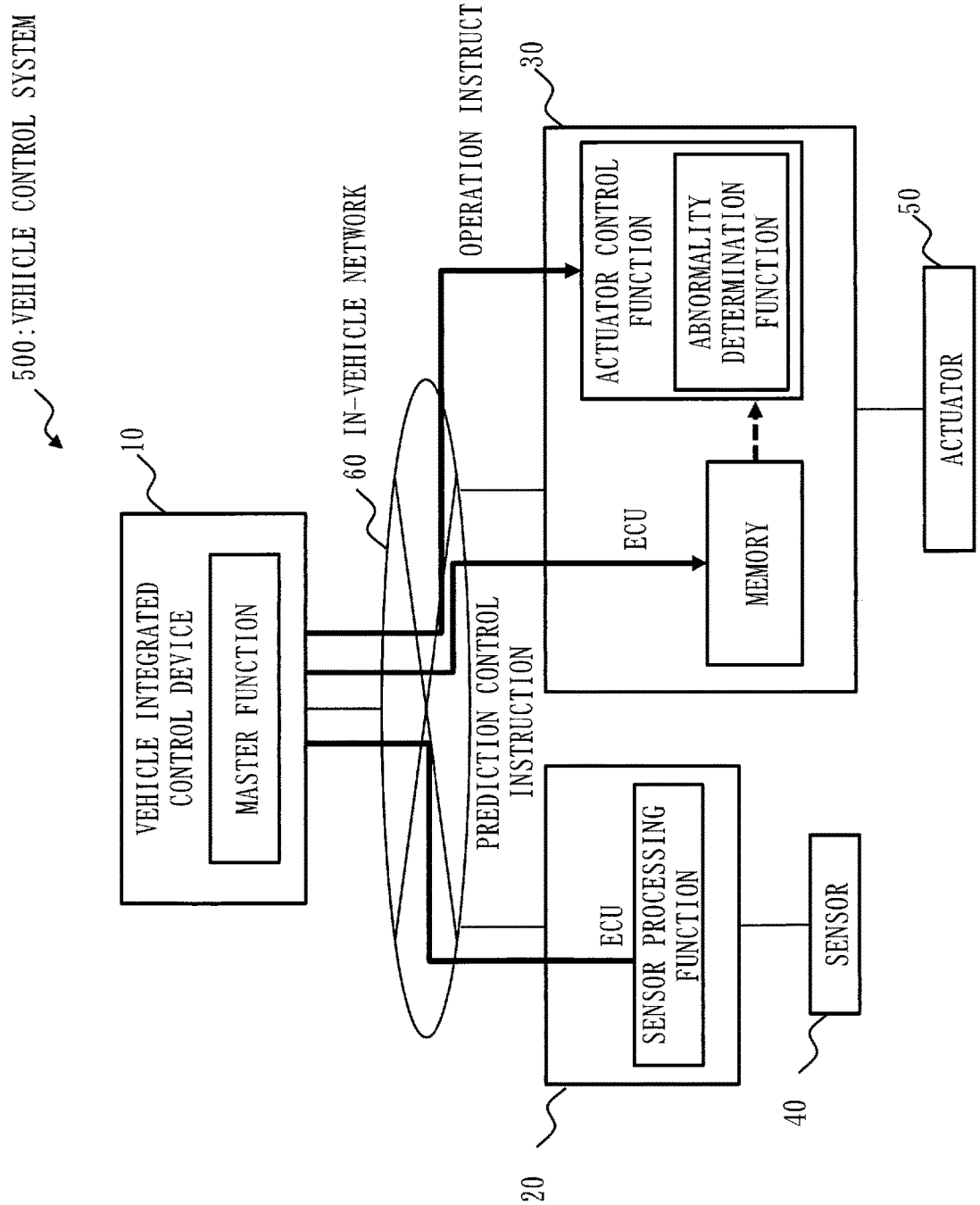
FIG. 1 is a configuration example of a vehicle control system according to a first embodiment.

Hereinafter, embodiment of the present invention will be described using diagrams. In each diagram, same elements or corresponding elements are denoted by same reference numerals. In the following explanation of the embodiments, description of the same or the corresponding elements is omitted or simplified appropriately. Further, in the following diagrams, the relation between the size of each configurational element may differ from actual elements. Furthermore, in the description of the embodiments, directions or positions such as above, below, left, right, front, back, obverse and reverse may be indicated. These indications are description applied for ease of explanation, which does not limit the positions, directions and orientations of devices, instruments and parts, etc.

First Embodiment

\*\*\*Explanation of Configuration\*\*\*<

<Configuration of Vehicle Control System 500>

With reference to FIG. 1, description is made on a configuration example of a vehicle control system 500 according to the present embodiment.

The vehicle control system 500 is a system to control a vehicle whereon a plurality of electronic control devices each controlling an actuator, and a vehicle integrated control device 10 to control the plurality of electronic control devices are mounted. The vehicle control system 500 includes an in-vehicle network 60 that connects the vehicle integrated control device 10 with each of the plurality of electronic control devices. The vehicle integrated control device 10 is connected to an ECU 20 and an ECU 30 via the in-vehicle network 60. Hereinafter, electronic control devices are called ECUs.

A sensor 40 is connected to the ECU 20. The ECU 20 has a sensor processing function to process sensor data from the sensor 40, and transmits the sensor data to the vehicle integrated control device 10 via the in-vehicle network 60. The sensor 40 includes sensors such as a rider, a radar, a sonar, a camera, an acceleration sensor, an accelerator opening degree sensor and a steering angle sensor.

Further, the ECU 30 is connected to an actuator 50. The ECU 30 has an actuator control function to control the actuator 50 based on an operation instruction from the vehicle integrated control device 10. The actuator control function includes an abnormality determination function to determine an abnormality in the operation instruction. The ECU 30 includes an ECU such as an engine ECU, a brake control ECU, an electric power steering ECU or an ADAS-ECU. Further, the actuator 50 includes actuators such as a throttle motor, a brake pressure adjustment actuator and a steering motor.

<Configuration of Vehicle Integrated Control Device 10>

Figure 2:
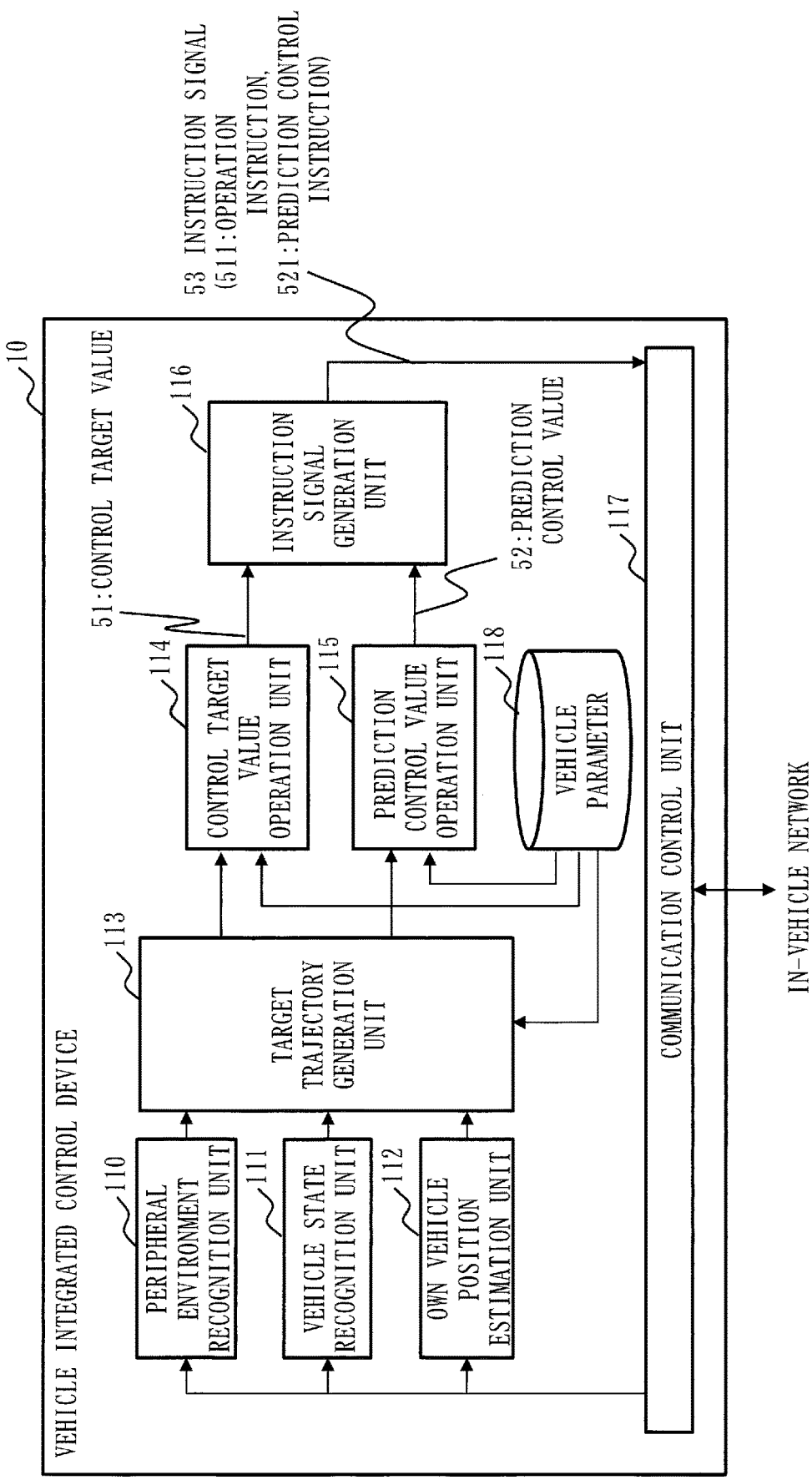
FIG. 2 is a configuration diagram of a vehicle integrated control device according to the first embodiment.

With reference to FIG. 2, description is made on a configuration example of the vehicle integrated control device 10 according to the present embodiment.

The vehicle integrated control device 10 includes, as a functional constitution, each unit of a peripheral environment recognition unit 110, a vehicle state recognition unit 111, an own vehicle position estimation unit 112, a target trajectory generation unit 113, a control target value operation unit 114, a prediction control value operation unit 115, an instruction signal generation unit 116, a communication control unit 117 and a vehicle parameter 118.

The peripheral environment recognition unit 110 acquires information received from sensors to measure peripheral environment, such as a light detection and ranging (hereinafter, LiDAR) device, a radar and a camera, etc. The peripheral environment recognition unit 110 recognizes information such as information on other vehicles surrounding the own vehicle, a traffic condition and signs as peripheral environment information, based on these pieces of information, and transits the peripheral environment information to the target trajectory generation unit 113.

The vehicle state recognition unit 111 acquires information received from sensors to measure the state of the own vehicle, such as an acceleration sensor, an angular velocity sensor, an accelerator opening degree sensor and a steering angle sensor. Based on these pieces of information, the vehicle state recognition unit 111 recognizes the state of the own vehicle such as a speed, acceleration, a steering angle of the own vehicle, and direction of the own vehicle, and transmits the state information of the own vehicle to the target trajectory generation unit 113.

The own vehicle position estimation unit 112 estimates the position of the own vehicle from sensor information from sensors such as a GNSS and a camera, and map information, and transmits the own vehicle position information to the target trajectory generation unit 113. GNSS is an abbreviation for a global navigation satellite system.

The target trajectory generation unit 113 calculates a target trajectory as a track whereby the own vehicle is capable of travelling safely, from destination information or a scheduled travelling route designated by a car navigation system, the own peripheral environment information, the own vehicle state information and the own vehicle position information.

The control target value operation unit 114 calculates a control target value 51 to control a plurality of ECUs 30 based on the present state of the vehicle and the target trajectory. The control target value 51 is a control amount necessary for realizing the target trajectory. The control target value to be transmitted to each ECU, such as a quantity of brake, a quantity of accelerator, and a steering angle necessary for realization of the target trajectory, is calculated from the target trajectory and a parameter of the own vehicle. The parameter of the own vehicle is stored in the vehicle parameter 118. The control target value is a control target value to be realized by the next control period.

The prediction control value operation unit 115 estimates a future state of the vehicle, and calculates prediction control values 52 for controlling the plurality of ECUs based on the state of the vehicle estimated and the target trajectory. The prediction control value operation unit 115 calculates prediction control values for a fixed period in the future. The prediction control values are a plurality of control target values for the fixed period in the future.

The instruction signal generation unit 116 generates an instruction signal 53 to transmit two types of values of a control target value 51 and a prediction control value 52 to the ECUs 30.

The instruction signal generation unit 116 acquires the control target value 51 and the prediction control value 52. The instruction signal generation unit 116 generates an operation instruction 511 to be transmitted to each of the plurality of ECUs 30 based on the control target value 51. Further, the instruction signal generation unit 116 generates a prediction control instruction 521 to be transmitted to each of the plurality of ECUs 30 based on the prediction control value 52. Then, the instruction signal generation unit 116 generates an instruction signal 53 including the operation instruction 511 and the prediction control instruction 521.

The communication control unit 117 receives sensor information from the ECU 20. The communication control unit 117 performs processing to notify the peripheral environment recognition unit 110, the vehicle state recognition unit 111 and the own vehicle position estimation unit 112 of the sensor information. Further, the communication control unit 117 performs processing to receive the instruction signal 53 from the instruction signal generation unit 116, and transmits the instruction signal 53 to the ECUs 30.

Figure 3:
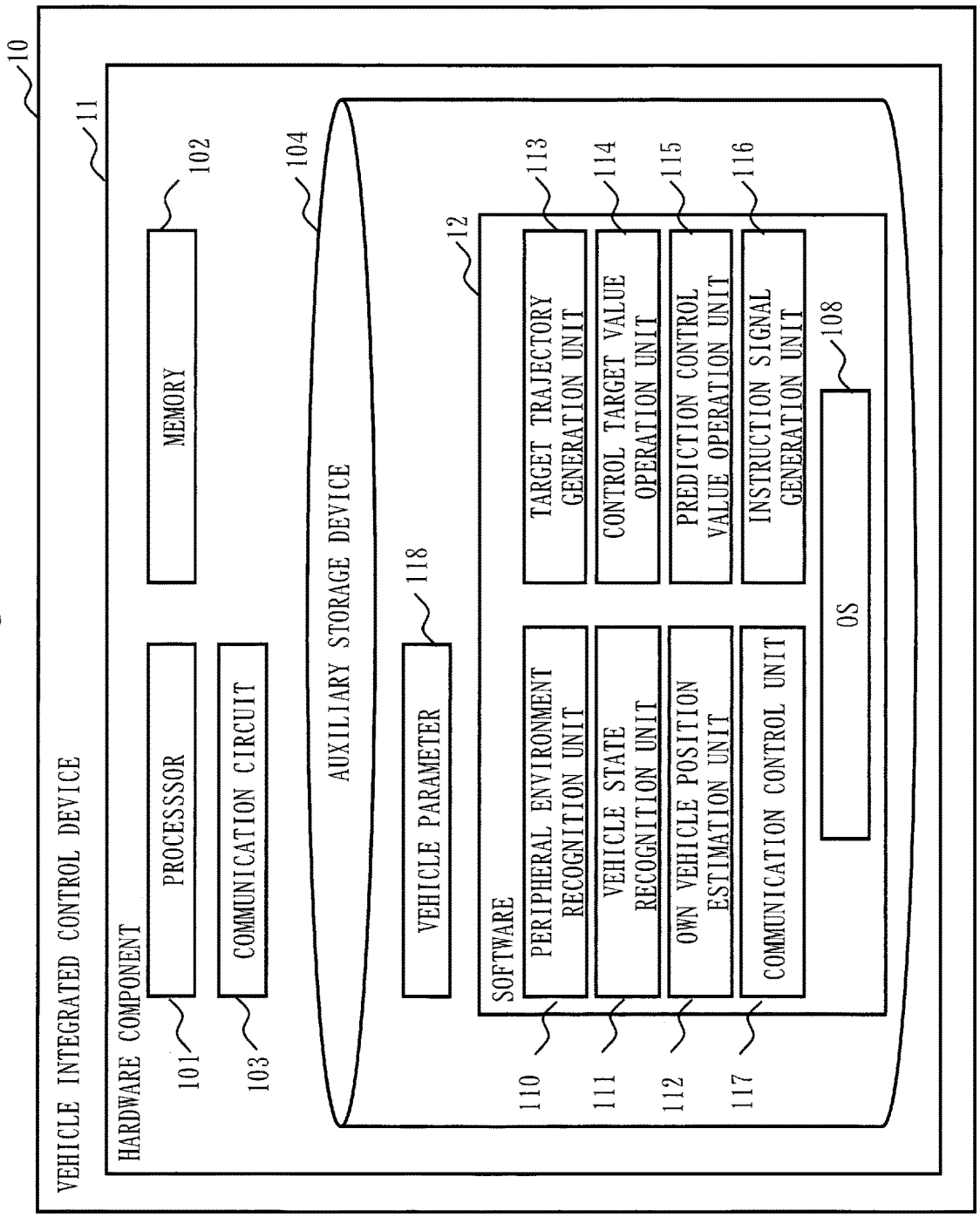
FIG. 3 is an example of a hardware configuration and an example of a software configuration of the vehicle integrated control device according to the first embodiment.

FIG. 3 is an example of a hardware configuration and an example of a software configuration of the vehicle integrated control device 10 according to the present embodiment.

The vehicle integrated control device 10 is a computer. The processing of the peripheral environment recognition unit 110, the vehicle state recognition unit 111, the own vehicle position estimation unit 112, the target trajectory generation unit 113, the control target value operation unit 114, the prediction control value operation unit 115, the instruction signal generation unit 116 and the communication control unit 117 is performed by a processor 101 by reading a program stored in a memory 102.

A hardware component 11 has a hardware configuration of the present embodiment, which includes the processor 101, the memory 102, a communication circuit 103 and an auxiliary storage device 104.

The processor 101 is a processing device to execute programs such as a vehicle control program and an OS (operating system). The processing device may be called an IC (integrated circuit); whereas, the processor 101 is, for example, a CPU (central processing unit), a DSP (digital signal processor), or a GPU (graphics processing unit).

The processor 101 is connected to the memory 102, which temporarily stores data necessary for arithmetic operation, stores data, reads out and executes the programs stored in the memory 102.

The processor 101 is connected to the communication circuit 103, which controls the communication circuit 103 in accordance with an instruction from the processor 101.

The vehicle integrated control device 10 in FIG. 3 includes only one processor 101; however, the vehicle integrated control device 10 may include a plurality of processors which substitute for the processor 101. These plurality of processors share execution of the programs.

The memory 102 is a storage device to temporarily store data, which functions as a main memory to be used as a work area of the processor 101. The memory 102 is a RAM (random access memory), such as an SRAM (static random access memory) or a DRAM (dynamic random access memory), for example. The memory 102 retains an operation result of the processor 101.

The auxiliary storage device 104 stores the vehicle parameter 118, various programs executed by the processor 101, software 12 and data used at an execution time of each program. The auxiliary storage device 104 is, for example, an HDD (hard disk drive) or an SSD (solid state drive). Further, the auxiliary storage device 104 may be a portable storage medium such as an SD (registered trademark) memory card, a CF, a NAND flash, a flexible disk, an optical disk, a compact disk, a Blue-ray (registered trademark) disk, or a DVD. SD (registered trademark) is an abbreviation for Secure Digital. CF is an abbreviation for CompactFlash (registered trademark). DVD is an abbreviation for Digital Versatile Disk.

The software 12 has a software configuration of the present embodiment, which includes the vehicle state recognition unit 111, the own vehicle position estimation unit 112, the target trajectory generation unit 113, the control target value operation unit 114, the prediction control value operation unit 115, the instruction signal generation unit 116, the communication control unit 117 and an OS 108.

The "unit" of each unit of the peripheral environment recognition unit 110, the vehicle state recognition unit 111, the own vehicle position estimation unit 112, the target trajectory generation unit 113, the control target value operation unit 114, the prediction control value operation unit 115, the instruction signal generation unit 116 and the communication control unit 117 may be replaced with "process," "procedure" or "step." The vehicle control program makes a computer execute each process being "process" with which "unit" of each unit is replaced. The "process" of each process may be replaced with "program," "program product," "computer-readable storage medium wherein a program is stored" or "computer-readable recording medium whereon a program is recorded." Further, a vehicle control method is a method performed by executing the vehicle control program by the vehicle control system 500.

The vehicle control program may be provided by being stored in a computer-readable recording medium. Alternatively, the vehicle control program may be provided as a program product.

*Explanation of Operation*<
<Operation of Vehicle Integrated Control Device 10>

Next, description is provided on an operation of the vehicle integrated control device 10 according to the present embodiment. An operation procedure of the vehicle integrated control device 10 corresponds to a vehicle control method. Further, a program to realize the operation of the vehicle integrated control device 10 corresponds to a vehicle control program.

Description will be hereinafter provided on a case wherein the vehicle integrated control device 10 collects sensor data and performs vehicle control.

Figure 4:
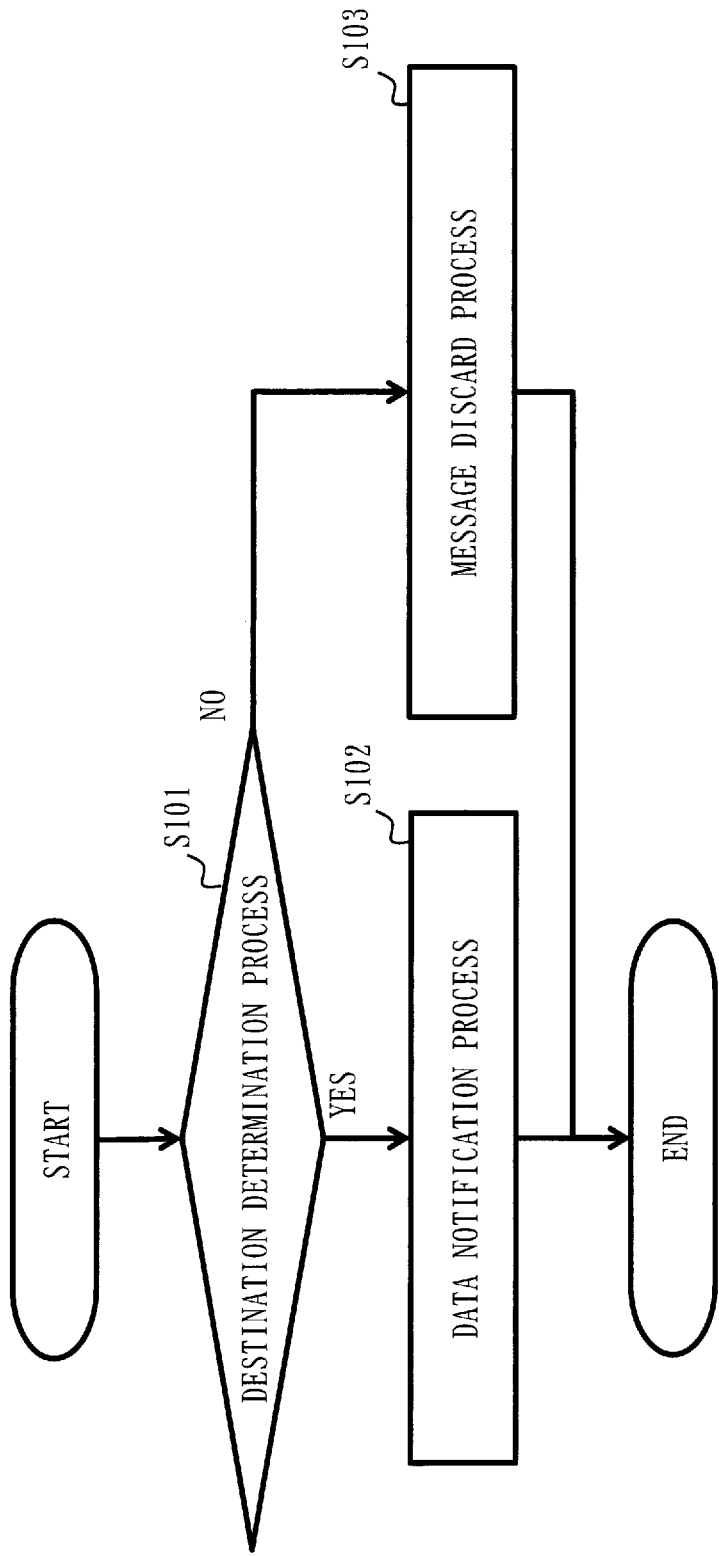
FIG. 4 is an example of a flowchart illustrating an operation of a communication control unit according to the first embodiment.

FIG. 4 is an example of a flowchart illustrating an operation of the communication control unit 117 according to the present embodiment. An order of the process indicated in the present flowchart may be changed appropriately.

(Step S101: Destination Determination Process)

When an incoming message is received from a sensor or an ECU, the communication control unit 117 determines whether a destination of the incoming message is the vehicle integrated control device 10. In a case wherein the destination of the incoming message is the vehicle integrated control device 10, the communication control unit 117 proceeds to step S102, and in other cases, the communication control unit 117 proceeds to step S103.

(Step S102: Data Notification Process)

The communication control unit 117 acquires data by removing a header from the incoming message. The communication control unit 117 notifies any of the peripheral environment recognition unit 110, the vehicle state recognition unit 111 and the own vehicle position estimation unit 112 in accordance with the type of the incoming message.

(Step S103: Message Discard Process)

The communication control unit 117 discards the incoming message.

Figure 5:
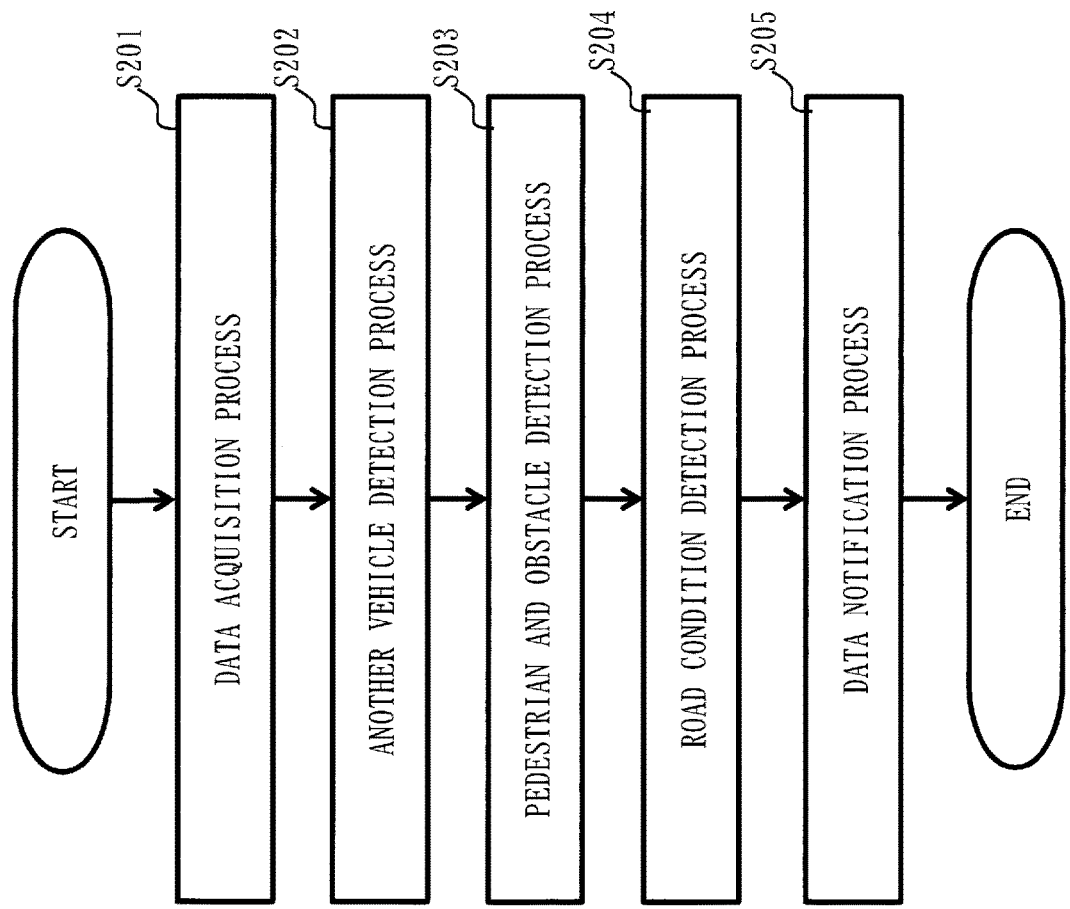
FIG. 5 is an example of a flowchart illustrating an operation of a peripheral environment recognition unit according to the first embodiment.

FIG. 5 is an example of a flowchart illustrating an operation of the peripheral environment recognition unit 110 according to the present embodiment. An order of the process indicated in the present flowchart may be change appropriately.

(Step S201: Data Acquisition Process)

The peripheral environment recognition unit 110 acquires various types of sensor data from a notification received from the communication control unit 117.

(Step S202: Another Vehicle Detection Process)

The peripheral environment recognition unit 110 detects, as information on another vehicle, information such as a distance and a direction from the own vehicle to the other vehicle or a relative position with respect to the own vehicle, a travelling direction, a moving speed, and a size, from the various types of sensor data acquired. When there are a plurality of other vehicles, information is identified for each vehicle. When a plurality of other vehicles exist, information is identified for each vehicle. As a detection method of the other vehicle, there are schemes such as image analysis using a camera, distance detection with a LiDAR, distance detection with a millimeter wave radar, where it is possible to perform detection also with a method using these schemes complexly.

(Step S203: Pedestrian and Obstacle Detection Process)

The peripheral environment recognition unit 110 detects, as information on a pedestrian and an obstacle, information such as a distance and a direction from the own vehicle or a relative position with respect to the own vehicle, and a size, from the various types of sensor data acquired. As a detection method of the pedestrian and the obstacle, it is possible to use a method similar to the other vehicle detection method.

(Step S204: Road Condition Detection Process)

The peripheral environment recognition unit 110 detects positions of a traffic lane and a road shoulder, a road sign and a road surface condition such as an irregularity and freezing, from the various types of sensor data acquired. As a detection method of the road surface condition, image analysis using a camera is mainly used.

(Step S205: Data Notification Process)

The peripheral environment recognition unit 110 notifies the target trajectory generation unit 113 of the information on the other vehicle, the pedestrian and obstacle, and the road condition detected from step S202 to step S204.

Figure 6:
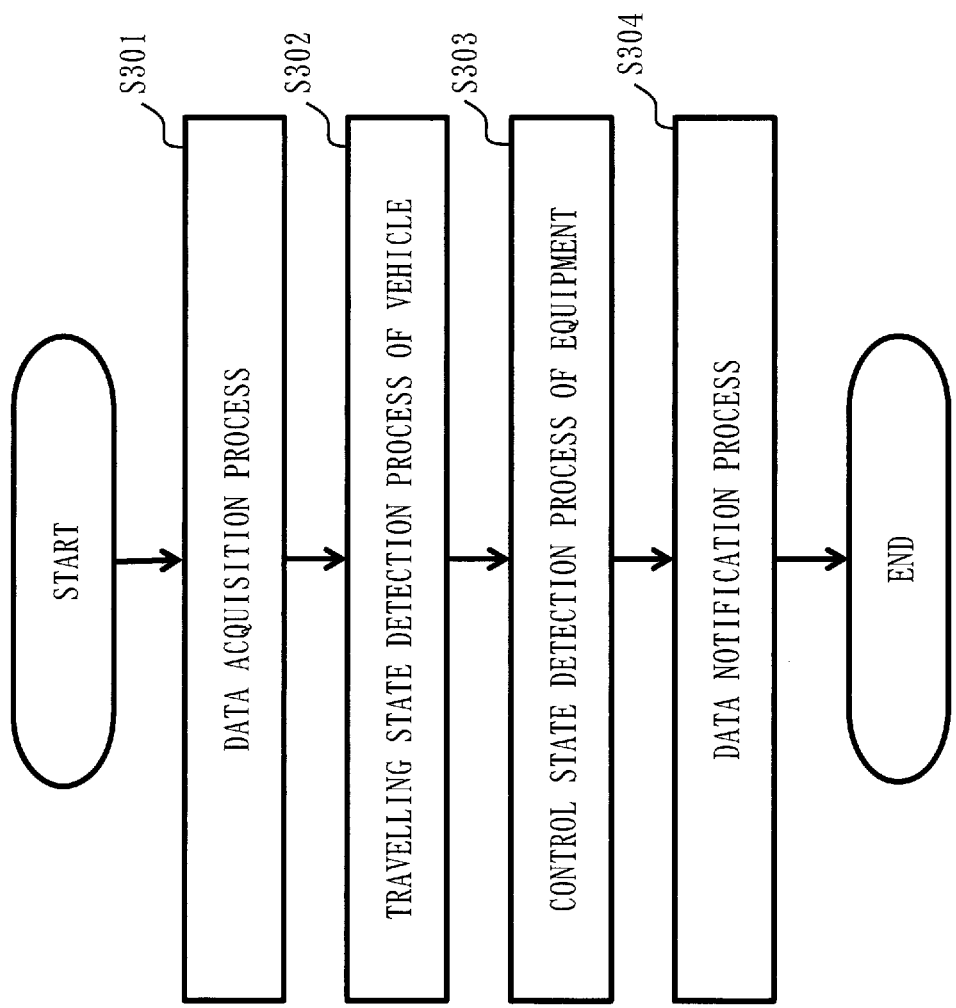
FIG. 6 is an example of a flowchart illustrating an operation of a vehicle state recognition unit according to the first embodiment.

FIG. 6 is an example of a flowchart illustrating an operation of the vehicle state recognition unit 111 according to the present embodiment. An order of the process indicated in the present flowchart may be changed appropriately.

(Step S301: Data Acquisition Process)

The vehicle state recognition unit 111 acquires the various types of sensor data from the notification received from the communication control unit 117.

(Step S302: Travelling State Detection Process)

The vehicle state recognition unit 111 detects, as a travelling state of the vehicle, information such as a speed, an acceleration, a yaw angle and a yaw rate, from the various types of sensor data acquired. Detection of the travelling state of the vehicle is performed with sensors such as a gyro sensor, an acceleration sensor and a yaw rate sensor.

(Step S303: Control State Detection Process of Equipment)

The vehicle state recognition unit 111 detects, as a control state of an in-vehicle unit, information such as a quantity of accelerator, a quantity of brake, a steering angle, a control amount of various types of actuators, and a control permissible range, from the various types of sensor data acquired and a state notification of ECUs.

(Step S304: Data Notification Process)

The vehicle state recognition unit 111 notifies the target trajectory generation unit 113 of the information on the travelling state of the vehicle and the control state of devices detected in step S302 and step S303.

Figure 7:
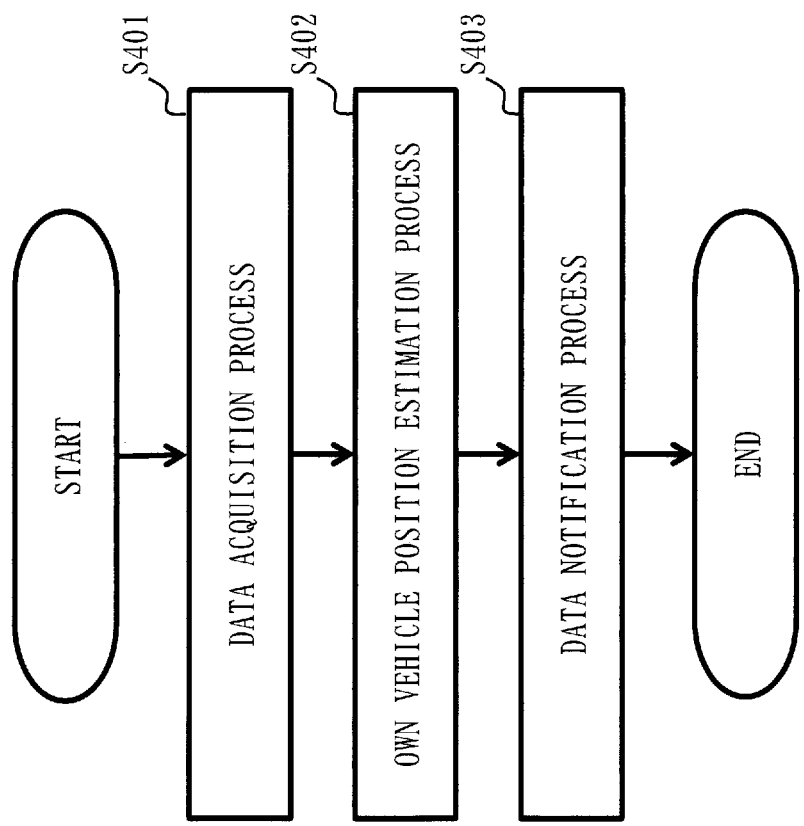
FIG. 7 is an example of a flowchart illustrating an operation of an own vehicle position estimation unit according to the first embodiment.

FIG. 7 is an example of a flowchart illustrating an operation of the own vehicle position estimation unit 112 according to the present embodiment. An order of the process indicated in the present flowchart may be changed appropriately.

(Step S401: Data Acquisition Process)

The own vehicle position estimation unit 112 acquires the various types of sensor data from the notification received from the communication control unit 117.

(Step S402: Own Vehicle Position Estimation Process)

The own vehicle position estimation unit 112 estimates a position of the own vehicle from the various types of sensor data acquired. There is a method to measure the position of the own vehicle by using a GNSS. Further, there is a method to estimate the position of the own vehicle with high accuracy based on cumulative moving information by using a gyro sensor, or a method to estimate the position of the own vehicle with high accuracy by collating information on a building and a road structure analyzed from a camera image with map information. Additionally, these methods may be combined appropriately.

(Step S403: Data Notification Process)

The own vehicle position estimation unit 112 notifies the target trajectory generation unit 113 of the information of the own vehicle position estimated in step S402.

Figure 8:
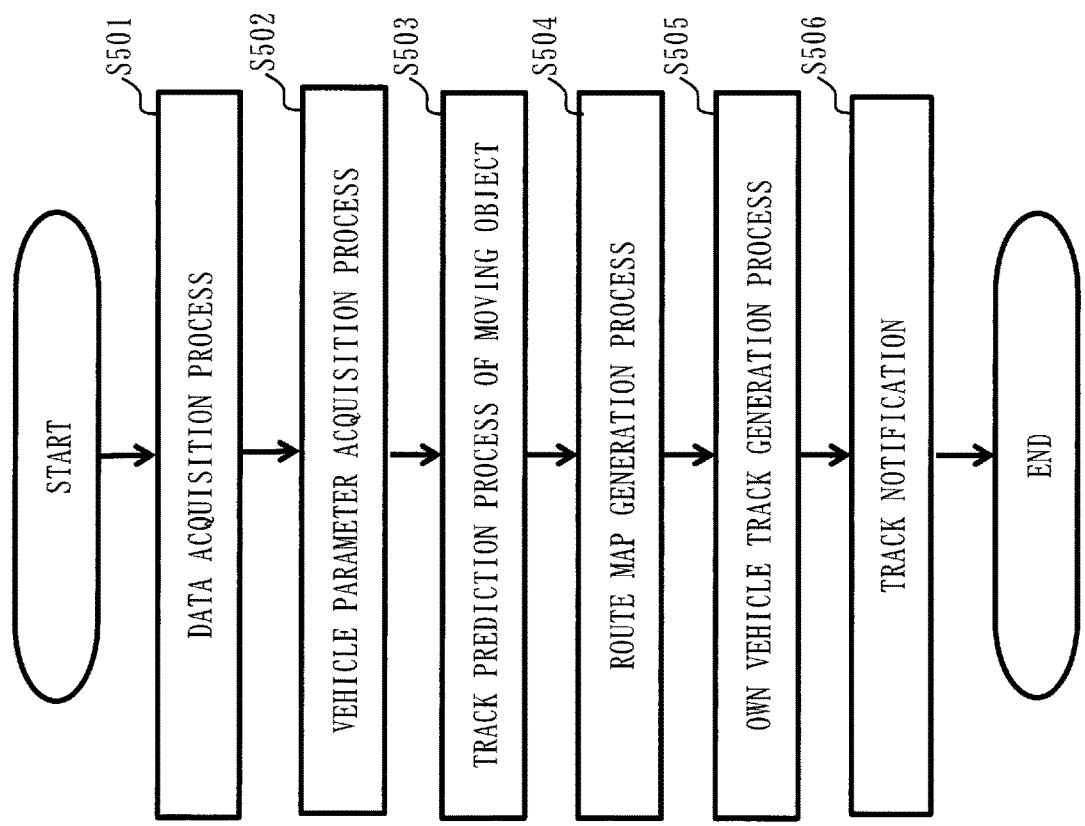
FIG. 8 is an example of a flowchart illustrating an operation of a target trajectory generation unit according to the first embodiment.

FIG. 8 is an example of a flowchart illustrating an operation of the target trajectory generation unit 113 according to the present embodiment. An order of the process indicated in the present flowchart may be changed appropriately.

The target trajectory generation unit 113 acquires relative position information between an obstacle and a vehicle by inter-vehicle communication or road-vehicle communication. Further, the target trajectory generation unit 113 acquires the relative position information between the obstacle and the vehicle acquired by a sensor provided in the vehicle. Based on the relative position information between the obstacle and the vehicle, and the map information, the target trajectory generation unit 113 predicts a future route of the obstacle, collates the future route of the obstacle with a scheduled travelling route of the vehicle, and generates a target trajectory. The target trajectory generation unit 113 collates the future route of the obstacle with the scheduled travelling route being a route plan of the vehicle, and then generates a target trajectory corrected so as to be a most safe route.

(Step S501: Data Acquisition Process)

The target trajectory generation unit 113 acquires the peripheral environment, the own vehicle state and the own vehicle position from the notification received from the peripheral environment recognition unit 110, the vehicle state recognition unit 111 and the own vehicle position estimation unit 112.

(Step S502: Vehicle Parameter Acquisition Process)

The target trajectory generation unit 113 acquires a period to calculate the target trajectory, and a control period of each ECU from the vehicle parameter 118.

(Step S503: Track Prediction Process of Moving Object)

The target trajectory generation unit 113 predicts a track of a moving object in a time-series order such as a position, a moving direction and a speed with respect to another vehicle and a pedestrian, from the information on the peripheral environment received. The track of the moving body is changed in accordance with each state of the moving object from a state at the point of time detected by the peripheral environment recognition unit 110, and is also changed by a mutual interaction between each moving object. By predicting the amount of change, the track of the moving object is calculated as time-series data. A track prediction period of the moving object is a target track calculation range N acquired in step S502.

(Step S504: Route Map Generation Process)

The target trajectory generation unit 113 generates a route map by superimposing the scheduled travelling route of the own vehicle, and the trajectory of the moving object around the route one upon another, from information on the track prediction information of the moving object, the map information and the information on the position of the own vehicle. The information generated by the route map is information at the level of granularity of a traffic lane.

Additionally, the scheduled travelling route is assumed to be set beforehand by a driver through input to devices such as a car navigation system and a smart phone.

(Step S505: Own Vehicle Track Generation Process)

The target trajectory generation unit 113 generates a track of the own vehicle making it possible to travel safely from the route map, the state of the own vehicle and the position of the own vehicle. A period to generate the track of the own vehicle is the target track calculation range N acquired in step S502. The target trajectory generation unit 113 calculates, as a track of the own vehicle, a position, a speed and a direction of the own vehicle in a time-series order. The target trajectory generation unit 113 calculates the track of the own vehicle as time-series data with the same period as a shortest period T among the control period of each ECU, or at shorter intervals.

When the track of the own vehicle is calculated, the target trajectory generation unit 113 generates a plurality of track candidates, and performs calculation by including also the size of the own vehicle so as not to make the own vehicle collide with peripheral moving objects and stationary objects. The target trajectory generation unit 113 selects a track of the own vehicle which minimizes indexes such as safety and a travelling time from the plurality of track candidates.

In a case wherein time-series data is calculated at intervals of the period T with respect to the target trajectory calculation range N, data of the track of the own vehicle is information of N/T pieces of positions, speeds and directions. For example, in a case wherein the target trajectory calculation range is N=30 seconds, and the period is T=0.05 seconds, the data of the track of the own vehicle becomes 600 pieces of data.

(Step S506: Track Notification)

The target trajectory generation unit 113 notifies the control target value operation unit 114 and the prediction control value operation unit 115 of the track of the own vehicle and the state of the own vehicle calculated in step S505 as a target trajectory.

Figure 9:
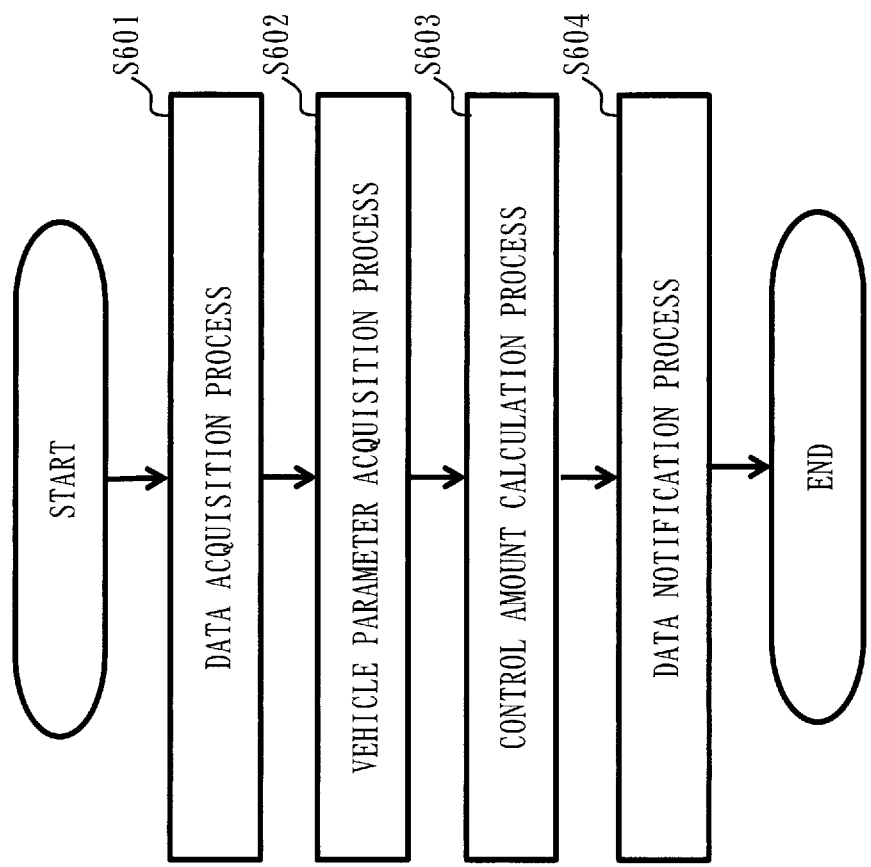
FIG. 9 is an example of a flowchart illustrating an operation of a control target value operation unit according to the first embodiment.
Figure 10:
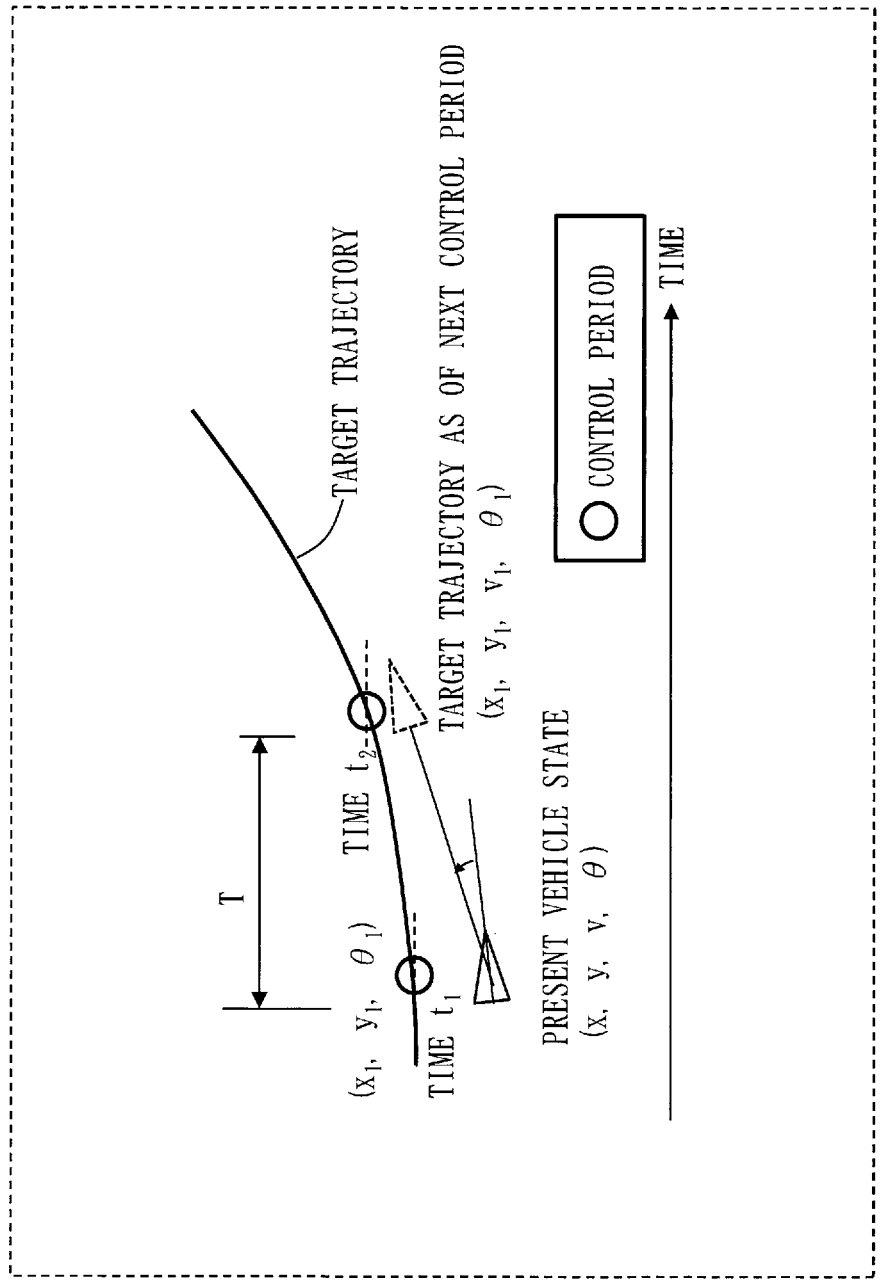
FIG. 10 is an example of a calculation method of a control target value according to the first embodiment.

FIG. 9 is an example of a flowchart illustrating an operation of the control target value operation unit 114 according to the present embodiment. FIG. 10 is a diagram illustrating an example of a calculation method of a control target value according to the present embodiment. An order of the process indicated in the present flowchart may be changed appropriately.

(Step S601: Data Acquisition Process)

The control target value operation unit 114 acquires the target trajectory from the notification received from the target trajectory generation unit 113. The target trajectory includes the track of the own vehicle and the state of the own vehicle.

(Step S602: Vehicle Parameter Acquisition Process)

The control target value operation unit 114 acquires the control period of each ECU and a controllable range of each ECU from the vehicle parameter 118.

(Step S603: Control Amount Calculation Process)

The control target value operation unit 114 calculates a control amount of each ECU so as to follow the target trajectory. Specifically, the control target value operation unit 114 calculates an amount of steering operation, an amount of accelerator control amount and an amount of brake control.

As illustrated in FIG. 10, the control target value operation unit 114 calculates a control target value from a difference between the present state of the own vehicle (x, y, v, θ) and a target trajectory after a next control period t seconds (x1, y1, v1, θ1). For example, the control target value operation unit 114 calculates the control target value in such a manner as: steering operation amount=θ1−θ and acceleration=(v1−v)/t. If the acceleration is a positive value, it becomes an amount of accelerator control, and if the acceleration is a negative value, it becomes an amount of brake control. When the amount of acceleration control and the amount of brake control exceed the controllable range of each ECU, correction is performed so that the control amounts fall within control ranges.

(Step S604: Control Amount Notification)

The control target value operation unit 114 notifies the instruction signal generation unit 116 of the control amount with respect to each ECU calculated in step S603 as a control target value 51.

Figure 11:
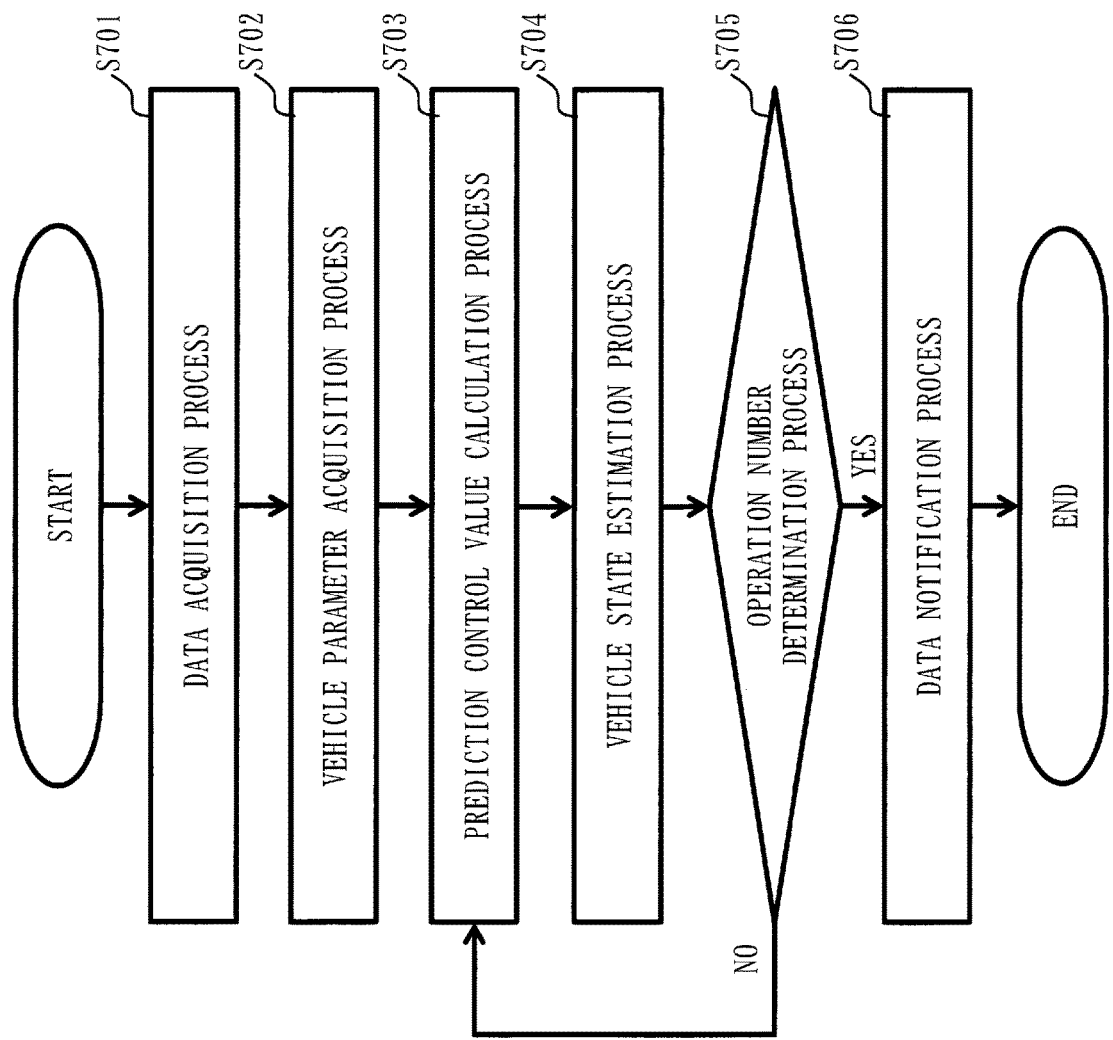
FIG. 11 is an example of a flowchart illustrating an operation of a prediction control value operation unit according to the first embodiment.
Figure 12:
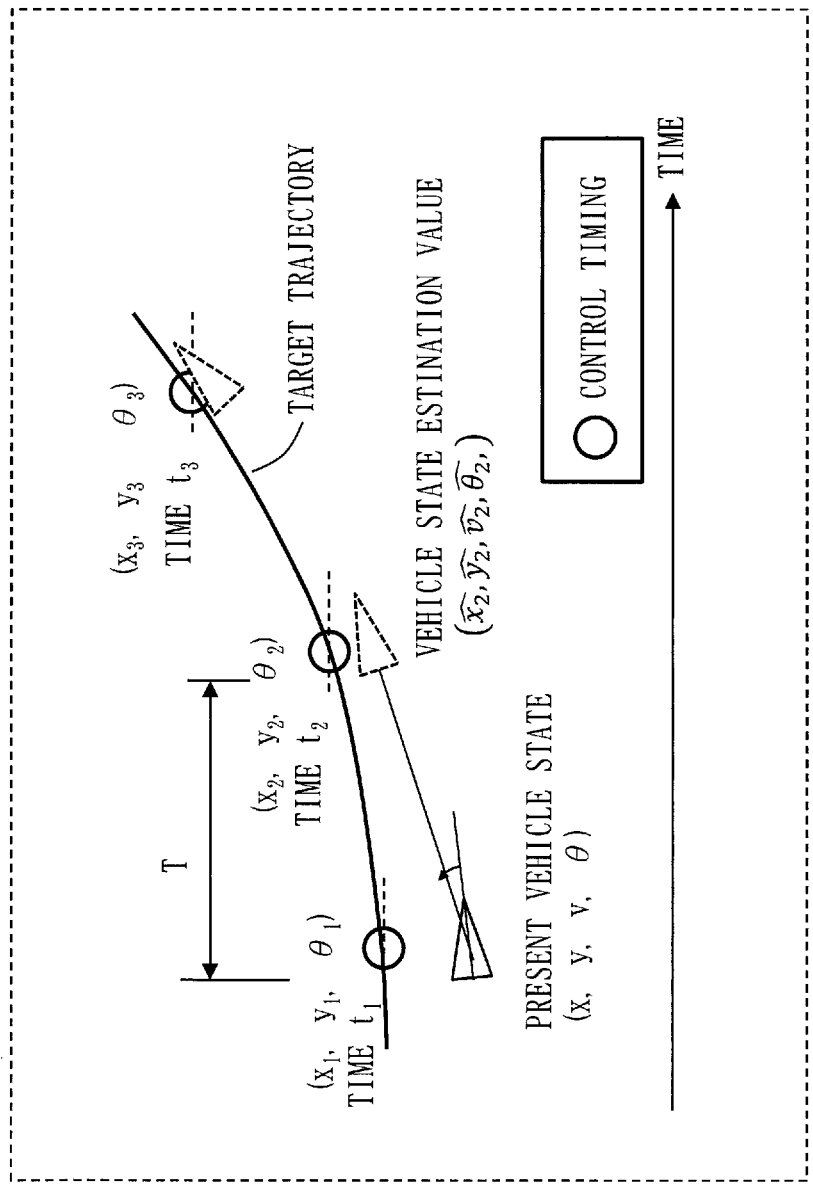
FIG. 12 is an example of a calculation method of a prediction control vale according to the first embodiment.

FIG. 11 is an example of a flowchart illustrating an operation of the prediction control value operation unit 115 according to the present embodiment. FIG. 12 is a diagram illustrating an example of a calculation method of a prediction control value according to the present embodiment. An order of the process indicated in the present flowchart may be changed appropriately.

(Step S701: Data Acquisition Process)

The prediction control value operation unit 115 acquires the target trajectory from the notification received from the target trajectory generation unit 113. The target trajectory includes the track of the own vehicle and the state of the own vehicle.

(Step S702: Vehicle Parameter Acquisition Process)

The prediction control value operation unit 115 acquires the control period of each ECU, the controllable range of each ECU and the target trajectory calculation range of each ECU from the vehicle parameter 118.

(Step S703: Prediction Control Value Calculation Process)

The prediction control value operation unit 115 calculates a prediction control value of each ECU so as to follow the target trajectory. With regard to calculation of the prediction control value, the prediction control value is calculated from a difference between a state of the vehicle estimated and the target trajectory in the next control period, and is calculated as with step S603 of the control target value operation unit 114. As for the vehicle state estimated (xe1, ye1, ve1, θe1), the state of the own vehicle notified from the target trajectory generation unit 113 is used in a first process, and in the second and following processes, a value estimated in step S704 is used.

(Step S704: Vehicle State Estimation Process)

As illustrated in FIG. 12, the prediction control value operation unit 115 estimates a vehicle state after the next control period t seconds (xe1, ye1, ve1, θe1) which is a state whereon the prediction control value is reflected from the prediction control value calculated in step S703. Estimation of a vehicle state can be calculated, in a case wherein a vehicle state before the prediction control value is reflected is (xp, yp, vp, θp), and the prediction control value is (steering operation amount=θ, acceleration=a), for example, as follows:

$$xe1=xp+t\times\cos(\theta p+\theta), ye1=yp+t\times\sin(\theta p+\theta)$$

$$ve1=vp+a\times t, \theta e1=\theta p+\theta$$

(Step S705: Operation Number Determination Process)

The prediction control value operation unit 115 calculates the number of times of operation of the prediction control value from the target trajectory calculation range N acquired in step S702, and the shortest period T among the control period of each ECU, as N/T times. The prediction control value operation unit 115 determines whether the operation number of the prediction control value attains N/T times. The prediction control value operation unit 115 proceeds to step S706 when the operation number of the prediction control value attains N/T times, and in other cases, proceeds to step S703.

(Step S706: Data Notification Process)

The prediction control value operation unit 115 notifies the instruction signal generation unit 116 of the prediction control value 52 in time series calculated in step S703.

Figure 13:
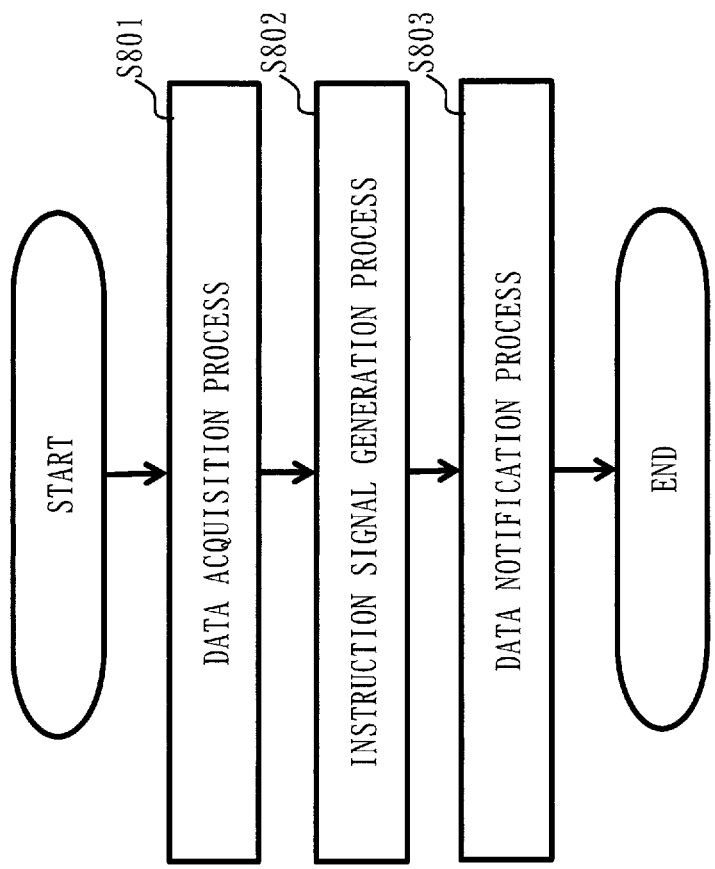
FIG. 13 is an example of a flowchart illustrating an operation of an instruction signal generation unit according to the first embodiment.

FIG. 13 is an example of a flowchart illustrating an operation of the instruction signal generation unit 116 according to the present embodiment. An order of the process indicated in the present flowchart may be changed appropriately.

(Step S801: Data Acquisition Process)

The instruction signal generation unit 116 acquires a control target value 51 and a prediction control value 52 to be transmitted to each ECU from the control target value operation unit 114 and the prediction control value operation unit 115.

(Step S802: Instruction Signal Generation Process)

The instruction signal generation unit 116 identifies necessary information in order for each ECU to control an actuator from among the control target value 51, and generates an operation instruction 511 for each ECU. For example, the instruction signal generation unit 116 generates an operation instruction 511 indicating change in acceleration for the engine ECU and the brake control ECU. Further, the instruction signal generation unit 116 generates an operation instruction 511 indicating a steering operation amount of a control target value for the electric power steering ECU.

Furthermore, the instruction signal generation unit 116 identifies necessary information for each ECU to control an actuator from among the prediction control value 52, and generates a prediction control instruction 521 for each ECU. For example, the instruction signal generation unit 116 generates a prediction control instruction 521 indicating change in acceleration for the engine ECU and the brake control ECU. Further, the instruction signal generation unit 116 generates a prediction control instruction 521 indicating a steering operation amount of the prediction control value 52 for the electric power steering ECU.

As a notification method of the prediction control value 52, the instruction signal generation unit 116 may adopt a method to make a notification of a difference with the prediction control value 52 transmitted in the previous time. Alternatively, as a notification method of the prediction control value 52, the instruction signal generation unit 116 may adopt a method to compress data in a case wherein same data exists in the time-series data of one prediction control value 52, etc.

(Step S803: Data Notification Process)

The instruction signal generation unit 116 notifies the communication control unit 117 of an instruction signal 53 including the operation instruction 511 and the prediction control instruction 521 generated in step S802.

The communication control unit 117 transmits the instruction signal 53 notified from the instruction signal generation unit 116 to each ECU.

\*\*\*Explanation of Configuration\*\*\*<
<Configuration Example of ECU 30>

Figure 14:
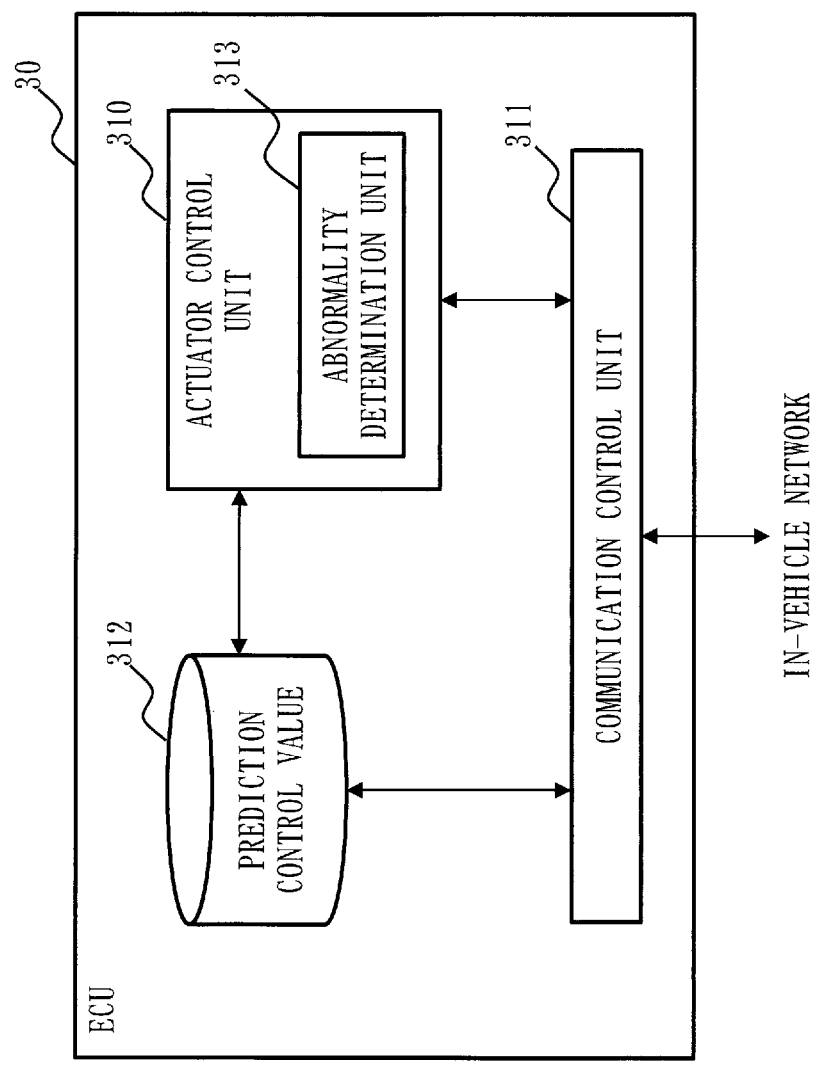
FIG. 14 is a configuration example of an ECU according to the first embodiment.

Next, with reference to FIG. 14, description is made on a configuration example of the ECU 30 according to the present embodiment.

The ECU 30 includes each unit of an actuator control unit 310, a communication control unit 311 and a prediction control value 312 as a functional constitution. The actuator control unit 310 includes an abnormality determination unit 313.

The abnormality determination unit 313 determines whether an abnormality exists in the operation instruction 511.

The actuator control unit 310 calculates a control amount of each actuator 50 connected to the ECU 30 based on the operation instruction 511 transmitted from the vehicle integrated control device 10, and performs control over each actuator. Further, when there is an abnormality in the operation instruction 511 from the vehicle integrated control device 10, the actuator control unit 310 reads out the prediction control instruction 521 from the prediction control value 312, calculates a control amount of each actuator connected to the ECUs based on the prediction control instruction 521 read out, and performs control over each actuator.

The communication control unit 311 receives the operation instruction 511 and the prediction control instruction 521 from the vehicle integrated control device 10, notifies the actuator control unit 310 of the operation instruction, and performs a writing process to write the prediction control instruction 521 in the prediction control value 312.

Figure 15:
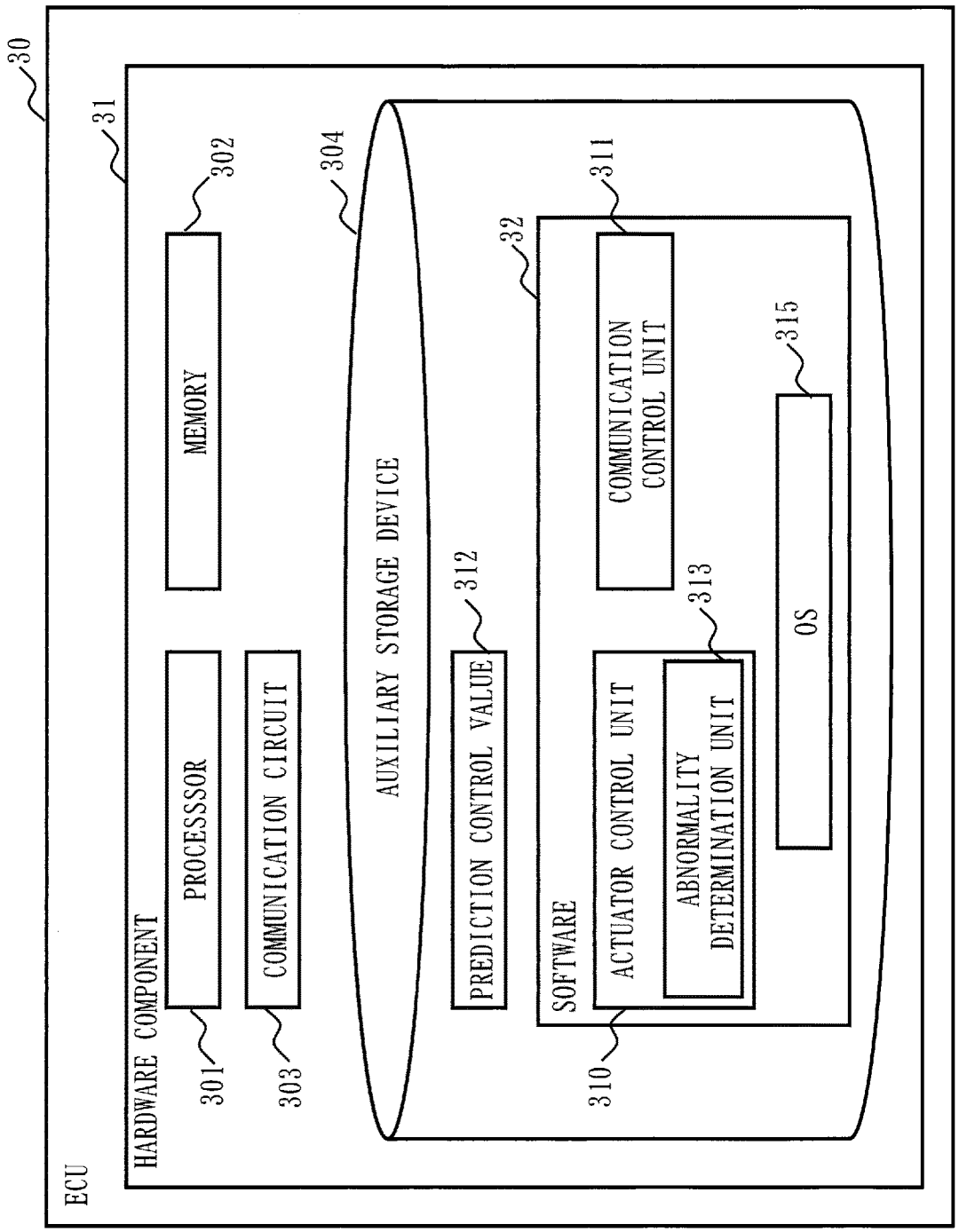
FIG. 15 is an example of a hardware configuration and an example of a software configuration of the ECU according to the first embodiment.

FIG. 15 is an example of hardware configuration and an example of software configuration of the ECU 30 according to the present embodiment.

Processes of the actuator control unit 310 and the communication control unit 311 are performed by a processor 301 reading a program stored in a memory 302.

A hardware component 31 indicates the hardware configuration of the present embodiment, which includes the processor 301, the memory 302, a communication circuit 303 and an auxiliary storage device 304.

The processor 301 is a processing device that executes an actuator control program and an OS. The processing device may be called an IC, and the processor 301 is, for example, a CPU, a DSP or a GPU.

The processor 301 is connected to the memory 302, which temporarily stores data necessary for an arithmetic operation, or saves data, and reads and executes the program stored in the memory 302.

The processor 301 is connected to the communication circuit 303, which performs control over the communication circuit 303 due to an instruction from the processor 301.

The ECU 30 in FIG. 15 includes only one processor 301; however, the ECU 30 may include a plurality of processors which substitute for the processor 301. The plurality of processors share a process such as execution of a program.

The memory 302 is a storage device to temporarily store data, which functions as a main memory used as a work area of the processor 301. The memory 302 is, for example, a RAM such as an SRAM or a DRAM. The memory 302 keeps a result of the arithmetic operation in the processor 301.

The auxiliary storage device 304 stores the prediction control value 312, various programs executed by the processor 301, software 32, and data used at the time of execution of each program. The auxiliary storage device 304 is, for example, an HDD or an SSD. Further, the auxiliary storage device 304 may be a portable recording medium, such as a memory card, an SD memory card, a CF, a NAND flash, a flexible disk, an optical disk, a compact disk, a Blue-ray disk, or a DVD.

The software 32 illustrates the software configuration of the present embodiment, which includes an actuator control unit 310, a communication control unit 311 and an OS 315.
*Explanation of Operation*<
<Operation of ECU 30>

Next, description is made on an operation of the ECU 30 according to the present embodiment. An operation procedure of the ECU 30 corresponds to an actuator control method. Further, a program to realize the operation of the ECU 30 corresponds to an actuator control program.

Hereinafter, description is made on a case wherein the ECU 30 receives an instruction from the vehicle integrated control device 10, and performs control over an actuator.

Figure 16:
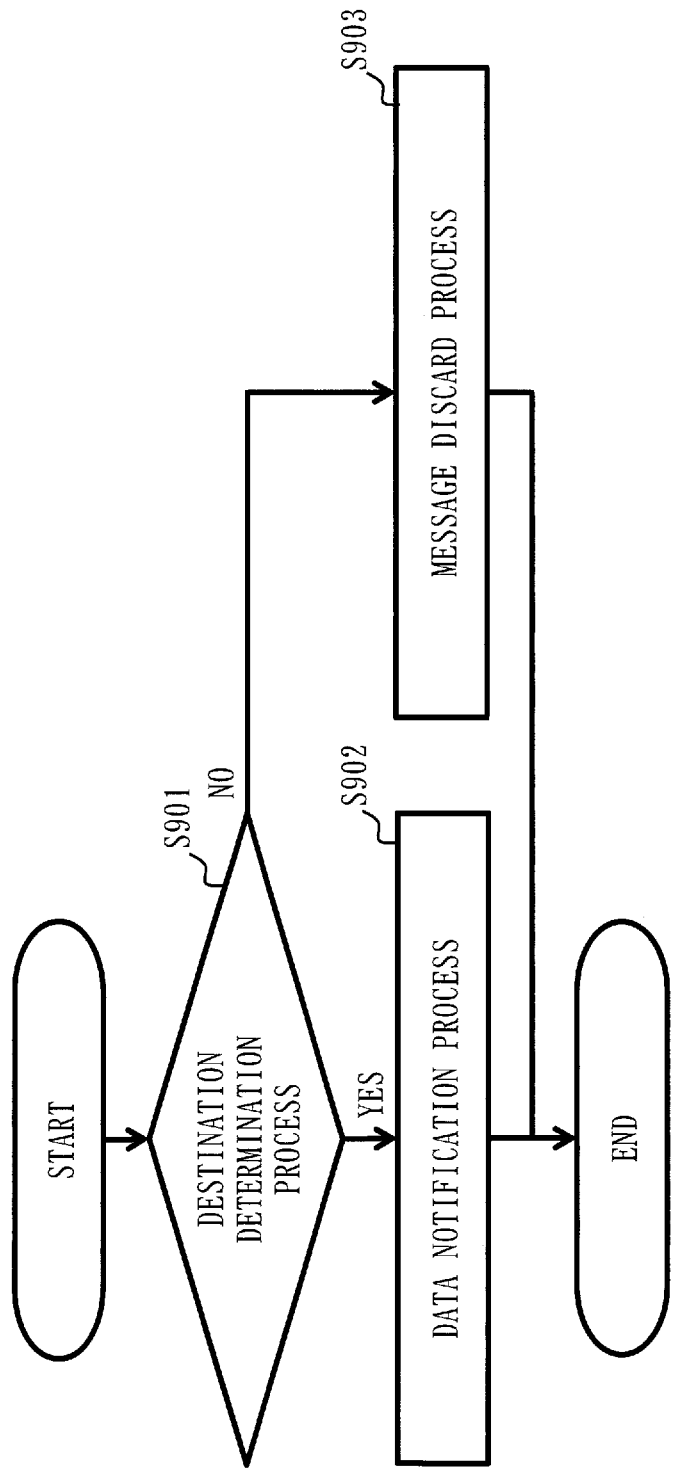
FIG. 16 is an example of a flowchart illustrating an operation of a communication control unit according to the first embodiment.

FIG. 16 is an example of a flowchart illustrating an operation of the communication control unit 311 according to the present embodiment. An order of the process indicated in the present flowchart may be changed appropriately.
(Step S901: Destination Determination Process)

When an incoming message is received from the vehicle integrated control device 10, the communication control unit 311 determines whether a destination of the incoming message is the ECU 30. In a case wherein the destination of the incoming message is the ECU 30, the communication control unit 311 proceeds to step S902, and in another case, the communication control unit 311 proceeds to step S903.
(Step S902: Data Notification Process)

The communication control unit 311 acquires data by removing a header, etc. from the incoming message, and notifies the actuator control unit 310 or the prediction control value 312 in accordance with the type of the incoming message received.

It is necessary for a prediction control value stored in the prediction control value 312 to prevent a prediction control value on a memory from being overwritten with a prediction control instruction transmitted in an abnormal state. Therefore, it is possible to adopt a method wherein the communication control unit 311 keeps past prediction control instructions, and switches to a prediction control instruction by tracing the past prediction control instructions back to a point of time when an abnormality occurs in an operation instruction.
(Step S903: Message Discard Process)

The communication control unit 311 discards the incoming message.

Figure 17:
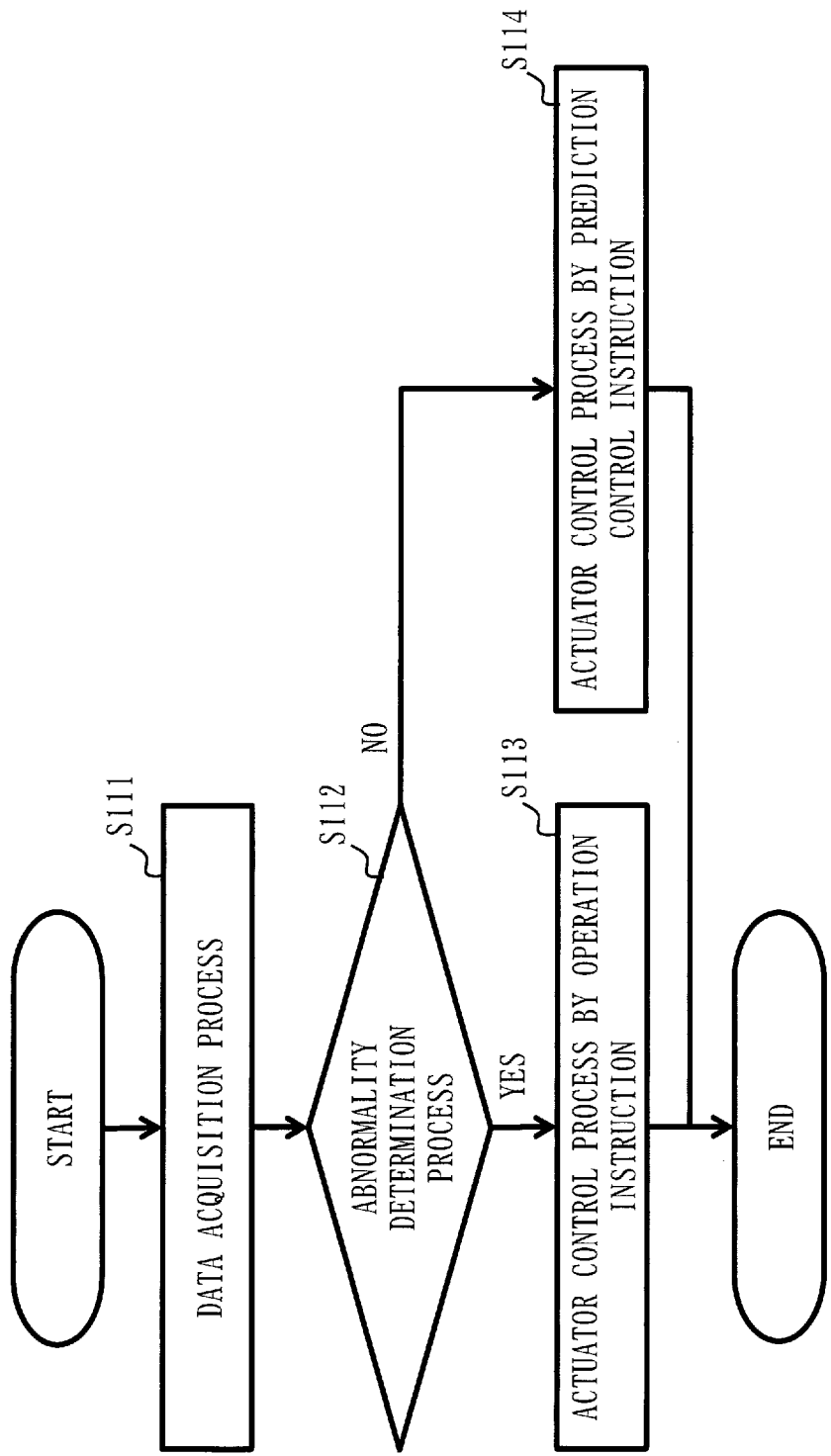
FIG. 17 is an example of a flowchart illustrating an operation of an actuator control unit according to the first embodiment.

FIG. 17 is an example of a flowchart illustrating an operation of the actuator control unit 310 according to the present embodiment. An order of the processing indicated in the present flowchart may be changed appropriately.

The actuator control unit 310 controls an actuator based on the prediction control instruction 521. Specifically, the abnormality determination unit 313 of the actuator control unit 310 determines whether there is an abnormality in the operation instruction 511. When there is no abnormality in the operation instruction 511, the actuator control unit 310 controls the actuator by using the operation instruction 511. Further, when there is an abnormality in the operation instruction 511, the actuator control unit 310 controls the actuator by using the prediction control instruction 521.

A concrete example of the operation of the actuator control unit 310 is as follows.
(Step S111: Data Acquisition Process)

The actuator control unit 310 acquires the operation instruction 511 from the communication control unit 311.
(Step S112: Abnormality Determination Process)

The actuator control unit 310 determines whether there is an abnormality in the operation instruction 511 from the vehicle integrated control device 10. When there is no abnormality in the operation instruction 511, the actuator control unit 310 proceeds to step S113. When there is an abnormality in the operation instruction 511, the actuator control unit 310 proceeds to step S114. As a method to determine existence or absence of an abnormality in the operation instruction 511, there is a method to confirm that the operation instruction 511 is not transmitted from the vehicle integrated control device 10. Further, it is also possible to determine by detecting a link disconnection with the vehicle integrated control device 10, or an abnormality notification from the vehicle integrated control device 10 or other in-vehicle units.

(Step S113: Actuator Control Process by Operation Instruction)

The actuator control unit 310 generates an operation instruction to control the actuator based on the operation instruction 511 from the vehicle integrated control device 10, and notifies the communication control unit 311 of the operation instruction.

(Step S114: Actuator Control Process by Prediction Control Instruction)

The actuator control unit 310 acquires the prediction control instruction 521 from the prediction control value 312, generates an operation instruction to control an actuator, and notifies the communication control unit 311 of the operation instruction. The prediction control value 312 is time-series data; therefore, it is also possible to acquire a prediction control instruction 521 at a relevant time for every control period of the actuator control unit 310, or to read out the prediction control instructions 521 at once from the prediction control value 312, and store the prediction control instructions 521 in a memory.

The communication control unit 311 transmits the operation instruction to the actuator.

EXPLANATION OF PRESENT EMBODIMENT

In the present embodiment, the vehicle integrated control device transmits a periodical control target value as an operation instruction, and calculates a prediction control value in a time-series order as a future control target value. The vehicle integrated control device transmits the prediction control value to an ECU as a prediction control instruction. The ECU stores the prediction control instruction in a memory as the prediction control value. In this manner, even when an abnormality is detected in the vehicle integrated control device or the operation instruction, it is possible for the ECU to continue control over an actuator by reading out the prediction control value stored in the memory in order.

Further, according to the present embodiment, it is necessary for the ECU 30 to calculate only an operation instruction to the actuator being an original function of an ECU, and a high-performance processor to calculate a prediction control value is unnecessary.

Other Configuration

First Modification

The target trajectory generation unit 113 may further generate a safety stop target trajectory being a target trajectory to make a vehicle stop safely in addition to a target trajectory following a scheduled travelling route. Specifically, the target trajectory generation unit 113 calculates the target trajectory so as to make a vehicle travel safely while following the scheduled travelling route, and further, calculates the safety stop target trajectory to make a vehicle stop safely within the number of operations in a target trajectory calculation range. Then, the prediction control value operation unit 115 calculates a prediction control value from the target trajectory following the scheduled travelling route, and additionally calculates a prediction control value from a safety stop target trajectory to make the vehicle stop safely.

Effect of First Modification

In the first embodiment as described above, the prediction control value operation unit 115 calculates prediction control values for the number of operations in the target trajectory calculation range by using the target trajectory calculated by the target trajectory generation unit 113 so as to make a vehicle travel safely while following the scheduled travelling route. However, in a case wherein the operation instruction remains in an abnormal condition even when a period of the target trajectory calculation range ends, the operation instruction is interrupted, and it becomes impossible to continue control over the actuator. Therefore, by generating a prediction control instruction so as to make a vehicle stop safely in the prediction control value operation unit 115, it is possible to make a vehicle stop safely even when an abnormality occurs in the operation instruction.

Second Modification

The actuator control unit 310 of the ECU 30 determines a factor of an abnormality when the abnormality is detected in an operation instruction, and selects a prediction control value used for control over an actuator in accordance with the factor of the abnormality.

The prediction control value operation unit 115 calculates a prediction control value from a target trajectory following a scheduled travelling route, and further calculates a prediction control value also from a target trajectory (safety stop target trajectory) to make a vehicle stop safely.

The actuator control unit 310 of the ECU 30 determines a factor of an abnormality when the abnormality is detected in an operation instruction, and in a case wherein the abnormality is such that the operation instruction is to be restored, the prediction control value following the scheduled travelling route is used, and in a case wherein the abnormality is such that the operation instruction is not to be restored, the prediction control value to make the vehicle stop safely is used.

Effect of Second Modification

According to the second modification, in accordance with the abnormality factor of the operation instruction, a prediction control instruction to be used by the actuator control unit 310 of the ECU 30 is selected, and in the case wherein the abnormality of the operation instruction is to be restored, the operation is continued, and it is possible to prevent an occupant from feeling discomfort due to unnecessary stopping of a vehicle. As examples of the case wherein the abnormality is to be restored, there are cases such as restarting the vehicle integrated control device, activating a redundant device or a redundant function, or transferring a driving function to a driver, for example.

Third Modification

When an abnormality occurs in an operation instruction, the ECU 30 performs communication with another ECU, and determines which prediction control instruction to use.

In this case, communication may be performed between ECUs, or an instruction may be given from an in-vehicle unit other than the ECUs.

Effect of Third Embodiment

The second modification indicates the embodiment wherein a prediction control instruction used in each ECU is selected. However, when each ECU selects a different prediction control instruction, there is a possibility that control over a vehicle is not integrated, and safety travelling may not be attained. For example, there is a case wherein the engine ECU operates so as to follow the scheduled travelling route, and the electric power steering ECU operates so as to make a vehicle stop safely. As described in the third embodiment, by integrating what prediction control instruction is to be used between ECUs, the operation of vehicle control is integrated, and it is possible to make a vehicle travel safely.

As described above, in the first embodiment to the third embodiment, the prediction control value operation unit generates a prediction control value from a target trajectory to make a vehicle stop safely. Further, the prediction control value operation unit generates a plurality of prediction control values in accordance with an abnormality factor of an operation instruction.

Fourth Embodiment

Further, in the first embodiment, the actuator control unit has a configuration that includes the abnormality determination unit. However, it is also possible to make the vehicle control system include an abnormality determination unit to determine whether an abnormality exists in an operation instruction. For example, it is possible to have the vehicle control system include another abnormality determination unit other than that in the actuator control unit, and to have the actuator control unit and the abnormality determination unit realize the functions of the first embodiment while exchanging information.

Figure 18:
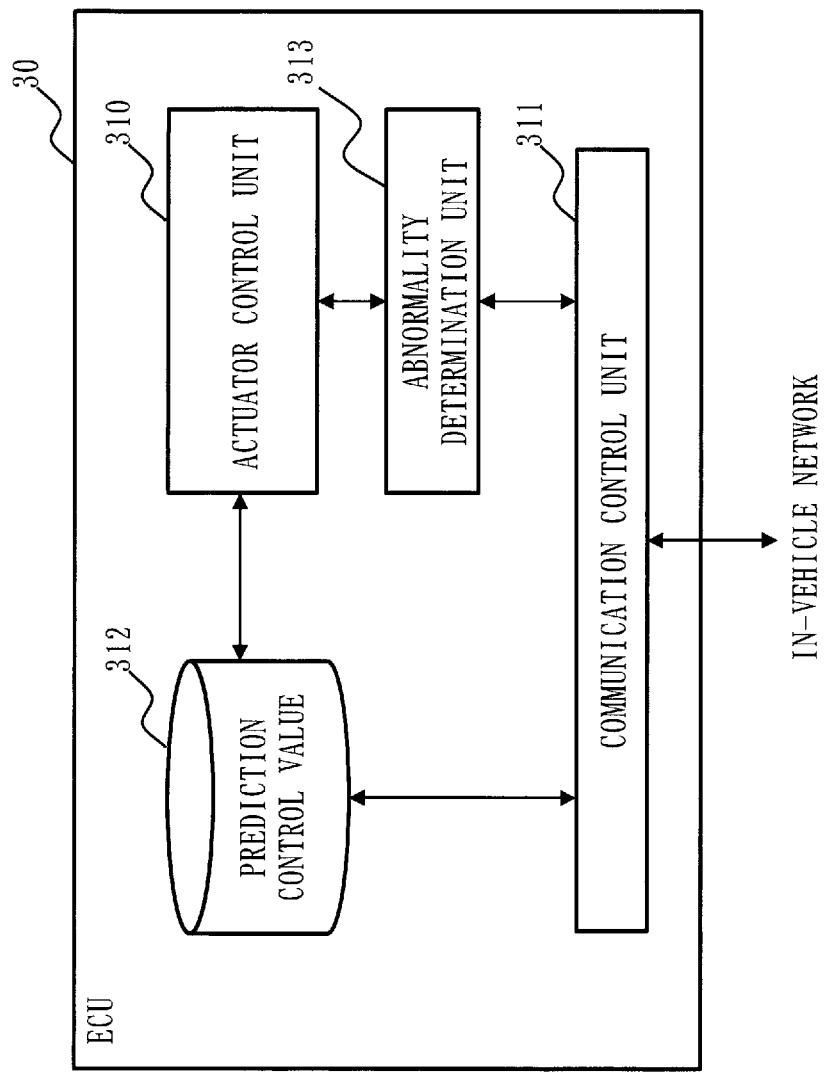
FIG. 18 is a configuration example of an ECU according to a fourth modification according to the first embodiment.

FIG. 18 is a configuration example of the ECU 30 according to a fourth embodiment of the present embodiment.

As illustrated in FIG. 18, for example, it is possible to have the ECU 30 include an abnormality determination unit 313 in addition to that in the actuator control unit 310, and to have the actuator control unit 310 and the abnormality determination unit 313 realize the functions of the first embodiment while exchanging information.

Effect of Fourth Modification

By the fourth embodiment according to the present embodiment, it is possible to perform change of a program with respect to an ECU more easily.

Fifth Modification

In the vehicle integrated control device 10 and each ECU 30 according to the present embodiment, a function of each unit is realized by software. As a modification, the function of each unit of the vehicle integrated control device 10 and each ECU 30 may be realized by hardware.

Specifically, the vehicle integrated control device 10 and each ECU 30 may include an electronic circuit instead of the processor.

The electronic circuit is a dedicated electronic circuit to realize functions of each unit. The electronic circuit is, specifically, a single circuit, a composite circuit, a processor that is made into a program, a processor that is made into a parallel program, a logic IC, a GA, an ASIC, and an FPGA. GA is an abbreviation for gate array. ASIC is an abbreviation for application specific integrated circuit. FPGA is an abbreviation for field-programmable gate array.

The function of each unit of the vehicle integrated control device 10 and each ECU 30 may be realized by one electronic circuit, or may be realized dispersively by a plurality of electronic circuits.

As another modification, a part of the functions of the vehicle integrated control device 10 and each ECU 30 may be realized by an electronic circuit, and other functions may be realized by software. Further, a part of or all of the functions of the vehicle integrated control device 10 and each ECU 30 may be realized by firmware.

Each of the processors and the electronic circuits may be called processing circuitry. That is, the functions of each unit of the vehicle integrated control device 10 and each ECU 30 are realized by processing circuitry.

Second Embodiment

In a present embodiment, description is made mainly on a point different from the first embodiment, and a point to be added to the first embodiment.

In the present embodiment, components including functions similar to those in the first embodiment are denoted by same reference numerals, for which description is omitted.

In the first embodiment, the prediction control instruction 521 transmitted from the vehicle integrated control device 10 is stored in the prediction control value 312 of the ECU 30, and determination by existence or absence of an abnormality is performed by an abnormality determination function included in the actuator control function of the ECU 30. In the configuration of the first embodiment, there is a case wherein change of a program of each ECU occurs, and the existing ECU may not be used.

In the present embodiment, description is made on a mode of storing information on the prediction control instruction 521, determining existence or absence of an abnormality of the operation instruction 511, deciding a prediction control value to be used, and notifying each ECU of the prediction control value, in a network communication device in an in-vehicle network.

Figure 19:
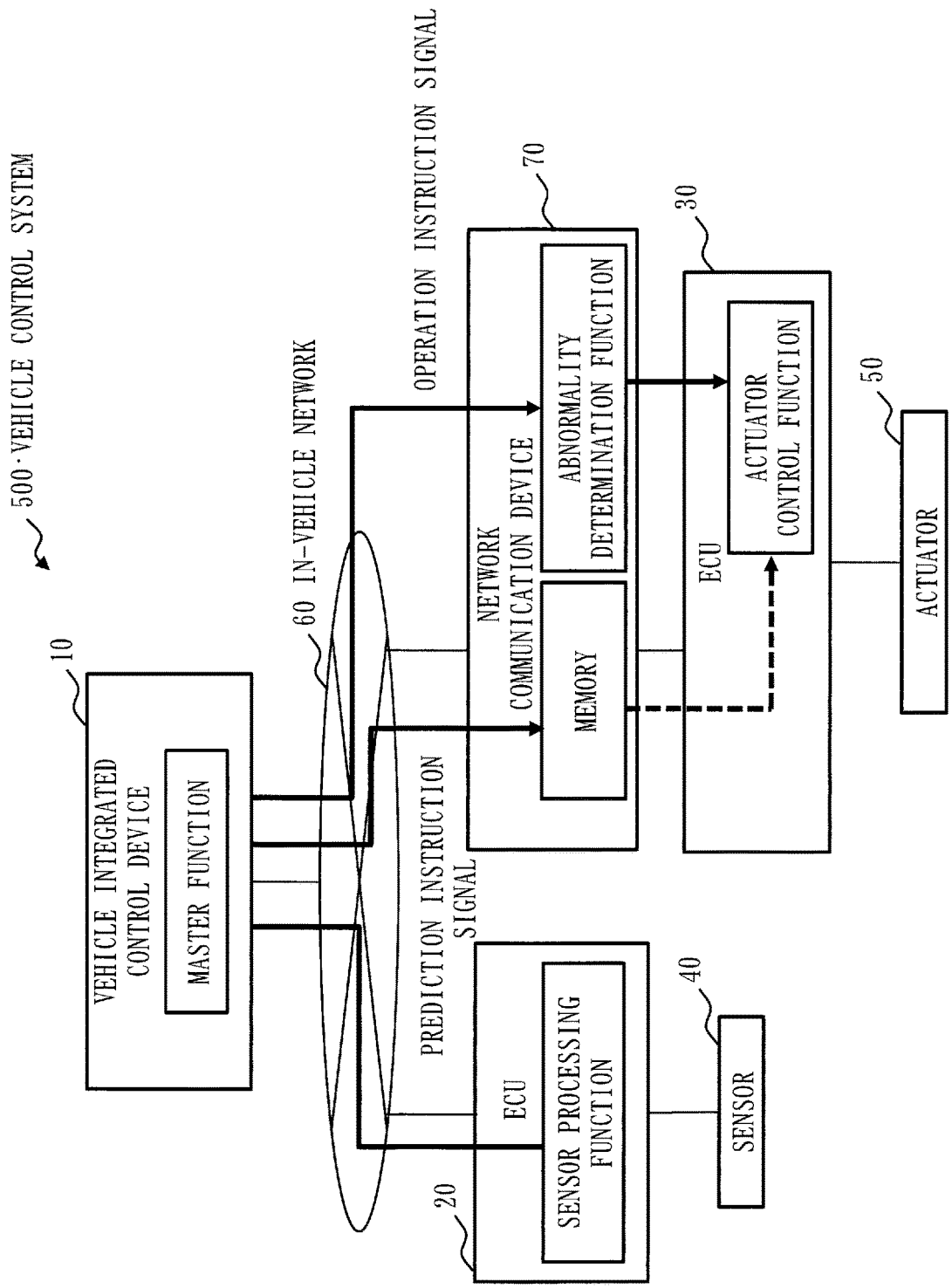
FIG. 19 is a configuration example of a vehicle control system according to a second embodiment.

FIG. 19 is a diagram illustrating a configuration example of the vehicle control system 500 according to the present embodiment.

The vehicle control system 500 according to the present embodiment includes a network communication device 70 in addition to the configuration of the first embodiment.

The network communication device 70 intervenes between the in-vehicle network 60 and each of a plurality of electronic control devices (ECUs 30)

The vehicle integrated control device 10 transmits the prediction control instruction 521 to the network communication device 70 on the in-vehicle network 60. The network communication device 70 stores the prediction control instruction 521 from the vehicle integrated control device 10 in a memory in the network communication device 70. Further, the network communication device 70 determines existence or absence of an abnormality in the operation instruction 511 transmitted from the vehicle integrated control device 10, and in a case when an abnormality exists in the operation instruction 511, the network communication device 70 transmits the prediction control instruction 521 stored in the memory to each ECU 30.

Alternatively, the network communication device 70 determines whether there is an abnormality in the operation instruction 511, and notifies the actuator control unit 310 of the determination result. Then, when there is an abnormality in the operation instruction 511, the actuator control unit 310 may perform control over the actuator by using the prediction control instruction 521 stored in the memory.

<Configuration Example of Network Communication Device 70>

Figure 20:
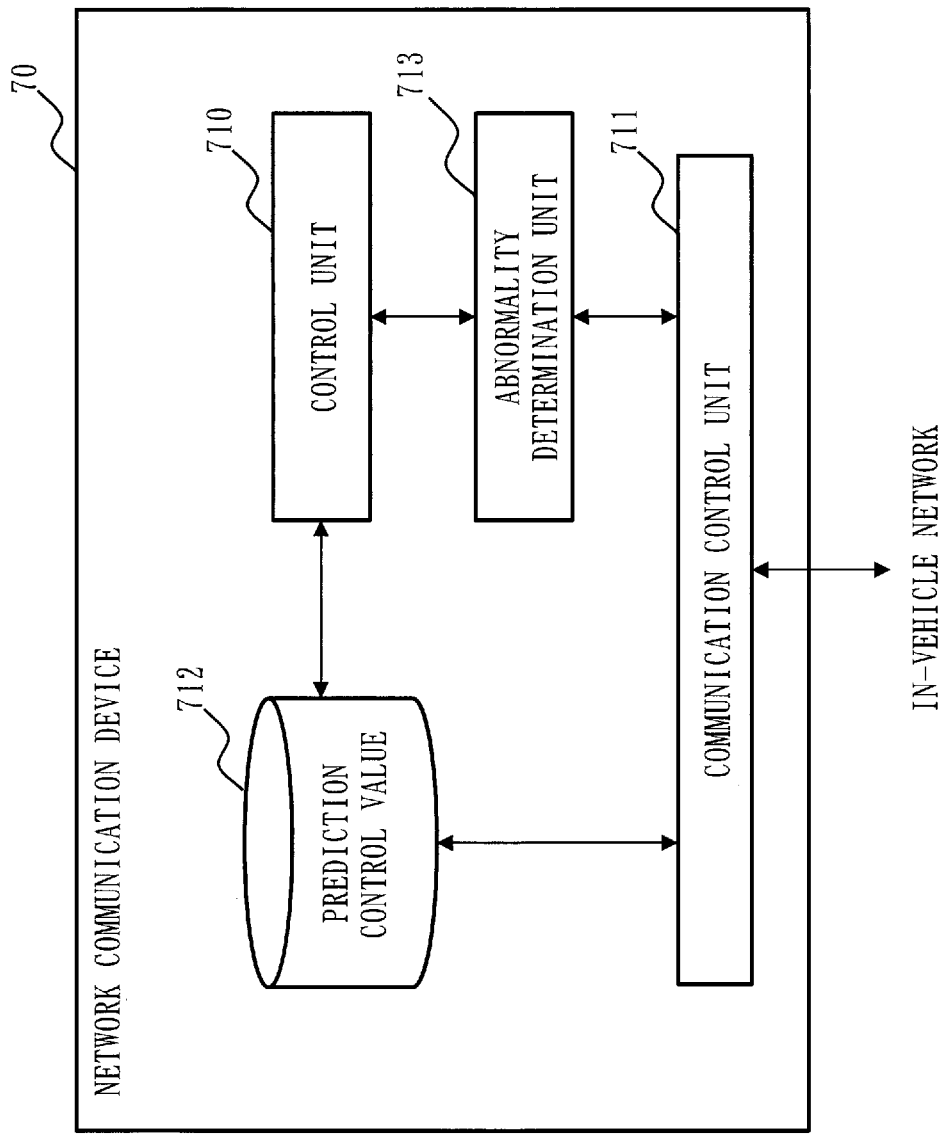
FIG. 20 is a configuration example of a network communication device according to the second embodiment.

With reference to FIG. 20, a configuration example of the network communication device 70 according to the present embodiment will be described.

The network communication device 70 includes each unit of a control unit 710, an abnormality determination unit 713, a communication control unit 711 and a prediction control value 712, as a functional constitution.

The communication control unit 711 receives an operation instruction 511 and a prediction control instruction 521 from the vehicle integrated control device 10, notifies the abnormality determination unit 713 of the operation instruction 511, and writes the prediction control instruction 521 in the prediction control value 712.

The abnormality determination unit 713 determines whether there is an abnormality in the operation instruction 511.

When there is an abnormality in the operation instruction 511, the control unit 710 acquires a prediction control instruction 521 to be used from the prediction control value 712, and notifies the ECU 30 of the prediction control instruction 521. For example, when an abnormality is detected in the operation instruction 511, the control unit 710 determines a factor of the abnormality, and selects a prediction control value to be used for control over the actuator in accordance with the factor of the abnormality. In a case wherein there is an abnormality in the operation instruction 511 to be restored, the control unit 710 uses a prediction control value to follow the scheduled travelling route, and in a case wherein there is an abnormality in the operation instruction 511 not to be restored, the control unit 710 uses a prediction control value to make a vehicle stop safely.

Further, when there is no abnormality in the operation instruction 511, the control unit 710 notifies the ECU 30 of the operation instruction 511.

Figure 21:
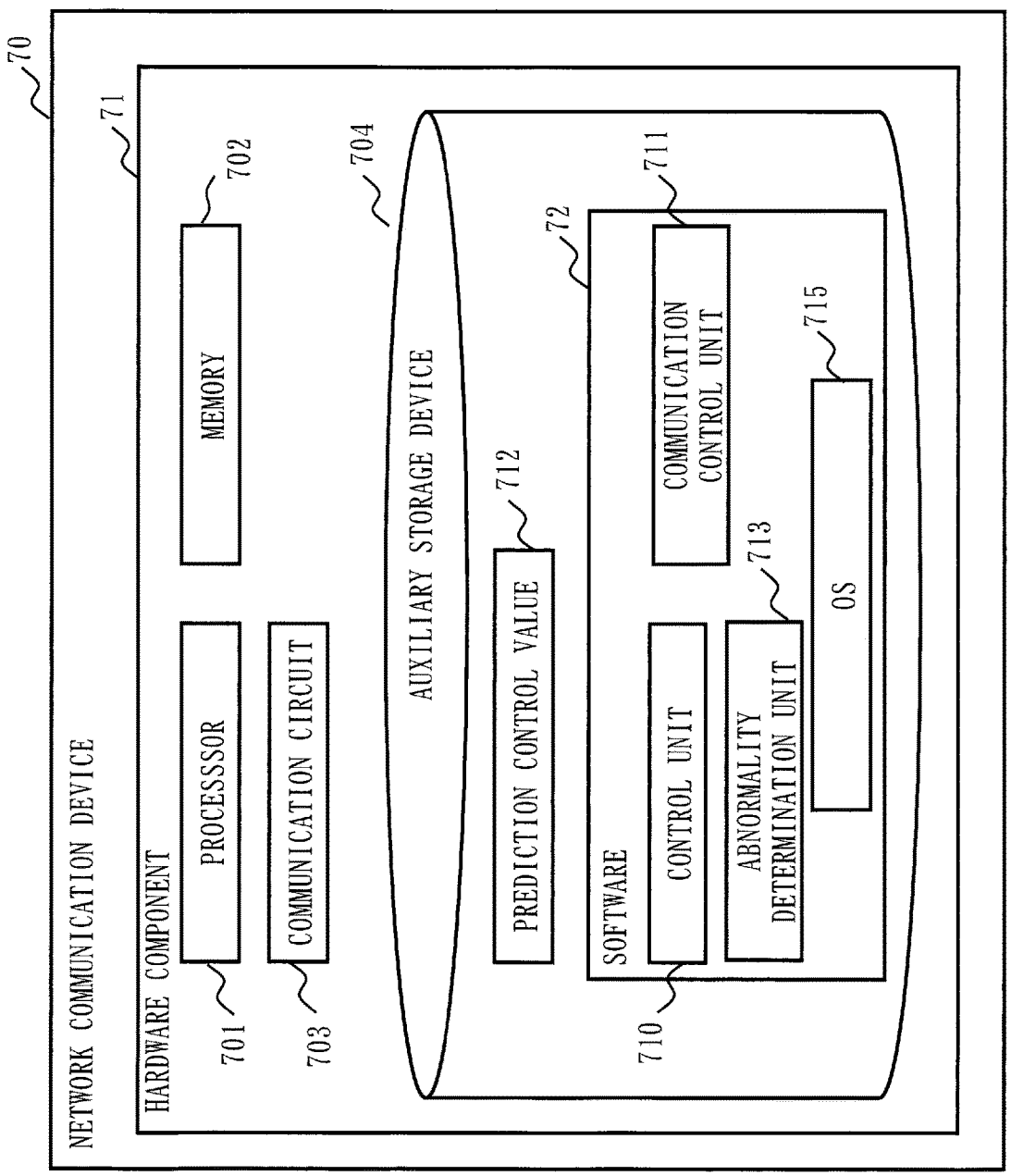
FIG. 21 is an example of a hardware configuration and an example of a software configuration of the network communication device according to the second embodiment.

FIG. 21 is an example of a hardware configuration and an example of a software configuration of the network communication device 70 according to the present embodiment.

A hardware component 71 indicates a hardware configuration of the network communication device 70, including a processor 701, a memory 702, a communication circuit 703 and an auxiliary storage device 704.

Software 72 indicates a software configuration of the present embodiment, including a control unit 710, an abnormality determination unit 713, a communication control unit 711 and an OS 715.

Each configuration of the hardware component 71 of the network communication device 70 is similar to that of the vehicle integrated control device 10 or the ECU 30. Further, as an abnormality determination function of the network communication device 70, an operation similar to that in the first embodiment is performed.

By the vehicle control system 500 according to the present embodiment, it is possible to continue operations of actuators even when an abnormality occurs in the operation instruction, without changing the structure and the operation of each ECU to control the actuators.

In the present embodiment, description is made on a vehicle control system as follows.

The vehicle control system includes a vehicle integrated control device wherein a program to generate prediction control instructions in a time-series order operates, and an ECU wherein a program to control an actuator based on information on the prediction control instruction operates.

By execution of the vehicle control program, the vehicle integrated control device generates an operation instruction to each ECU based on sensor information, and after predicting a vehicle state whereon the operation instruction is reflected, generates a prediction control instruction to provide an instruction on a future operation of each control unit. Then, the vehicle integrated control device transmits the prediction control instruction to each ECU.

Further, by execution of the vehicle control program, in the prediction control instruction, the vehicle integrated control device predicts a future route of an obstacle based on relative position information with respect to the obstacle according to inter-vehicle communication or road-vehicle communication, relative position information with respect to the obstacle obtained by a sensor to recognize vehicle exterior environment provided in the vehicle, and map information, and by collating the future route of the obstacle with a route plan of the vehicle, and corrects the route plan of the vehicle so as to be a most safe route.

Furthermore, by execution of the vehicle control program, the vehicle integrated control device generates a prediction control instruction to make the vehicle stop safely. Further, the vehicle integrated control device generates a plurality of prediction control instructions in accordance with an abnormality factor of the operation instruction. Additionally, the vehicle integrated control device generates a plurality of prediction control instructions, and transmits the plurality of prediction control instructions to the ECUs.

In the first embodiment and the second embodiment as described above, each unit of the vehicle integrated control device 10 and each of the ECUs 30 has been described as an independent functional block. However, the configuration of the vehicle integrated control device 10 and each of the ECUs 30 does not have to be the configuration as in the embodiments as described above. The functional blocks of the vehicle integrated control device 10 and each of the ECUs 30 may have any configuration as long as the functional blocks can realize the functions described in the embodiments as above. Further, the vehicle integrated control device 10 and each of the ECUs 30 may be a system composed of a plurality of vehicles instead of one device.

In addition, a plurality of parts of the first embodiment and the second embodiment may be combined and implemented. Alternatively, one part of these embodiments may be implemented. In addition, these embodiments may be implemented in any combination as a whole or partially.

That is, in the first embodiment and the second embodiment, it is possible to freely combine each embodiment, modify any component of each embodiment, or omit any components in each embodiment.

The embodiments as described above are essentially preferred examples, and are not intended to limit the scope of the present invention, the scope of application of the present invention, and the scope of use of the present invention. The embodiments as described above can be variously modified as needed.

REFERENCE SIGNS LIST

10: vehicle integrated control device; 11, 31, 71: hardware component; 12, 32, 72: software; 20, 30: ECU; 40: sensor; 50: actuator; 51: control target value; 52, 312, 712: prediction control value; 511: operation instruction; 521: prediction control instruction; 53: instruction signal; 60: in-vehicle network; 70: network communication device; 110: peripheral environment recognition unit; 111: vehicle state recognition unit; 112: own vehicle position estimation unit; 113: target trajectory generation unit; 114: control target value operation unit; 115: prediction control value operation unit; 116: instruction signal generation unit; 117, 311, 711: communication control unit; 313, 713: abnormality determination unit; 118: vehicle parameter; 101, 301, 701: processor; 102, 302, 702: memory; 103, 303, 703: communication circuit; 104, 304, 704: auxiliary storage device; 108, 315, 715: OS; 310: actuator control unit; 710: control unit; 500: vehicle control system

The invention claimed is:

1. A vehicle control system of a vehicle, the vehicle having mounted thereon a plurality of electronic control devices to each control an actuator, and a vehicle integrated control device to control the plurality of electronic control devices, wherein
the vehicle integrated control device includes processing circuitry to, during each of a plurality of successive control periods,
calculate a control target value to control the plurality of electronic control devices during the current control period based on a present state of the vehicle, and on a target trajectory generated based on a scheduled travelling route of the vehicle,
estimate a future state of the vehicle in the next control period, and calculate a prediction control value to control the plurality of electronic control devices during the next control period based on the state of the vehicle estimated and the target trajectory; and
acquire the control target value and the prediction control value, generate an operation instruction corresponding to the current control period to be transmitted to each of the plurality of electronic control devices based on the control target value, generate a prediction control instruction corresponding to the next control period to be transmitted to each of the plurality of electronic control devices based on the prediction control value, and generate an instruction signal including the operation instruction corresponding to the current control period and the prediction control instruction corresponding to the next control period, and wherein
each of the plurality of electronic control devices includes processing circuitry to selectively control the actuator during the current control period based on one of: the operation instruction included in the instruction signal generated in the current control period, and the prediction control instruction included in the instruction signal generated in the preceding control period.

2. The vehicle control system as defined in claim 1, wherein the processing circuitry of each of the plurality of electronic control devices controls the actuator, during the current control period, using the operation instruction included in the control instruction generated in the current control period in a case wherein there is no abnormality in the operation instruction included in the instruction signal generated in the current control period, and controls the actuator using the prediction control instruction included in the control instruction generated in the preceding control period in a case wherein there is an abnormality in the operation instruction included in the instruction signal generated in the current control period.

3. The vehicle control system as defined in claim 1, wherein the processing circuitry of the vehicle integrated control device predicts a future route of an obstacle based on relative position information between the obstacle and the vehicle by inter-vehicle communication or road-vehicle communication, relative position information between the obstacle acquired by a sensor provided in the vehicle and the vehicle, and map information, collates the future route of the obstacle with the scheduled travelling route, and generates the target trajectory.

4. The vehicle control system as defined in claim 3, wherein the processing circuitry of the vehicle integrated control device further generates a safety stop target trajectory being a target trajectory to make the vehicle stop safely in addition to the target trajectory.

5. The vehicle control system as defined in claim 4, wherein the processing circuitry of the vehicle integrated control device calculates the prediction control value corresponding to the next control period from the target trajectory following the scheduled travelling route generated in the current control period, and calculates the prediction control value corresponding to the next control period from the safety stop target trajectory generated in the current control period.

6. The vehicle control system as defined in claim 5, wherein the processing circuitry of each of the plurality of electronic control devices, during the current control period, determines a factor of an abnormality when the abnormality is detected in the operation instruction included in the instruction signal generated in the current control period, and selects the prediction control value included in the instruction signal generated in the preceding control period to be used in control over the actuator in accordance with the factor of the abnormality.

7. The vehicle control system as defined in claim 1, wherein the vehicle control system includes processing circuitry to determine whether an abnormality exists in the operation instruction.

8. The vehicle control system as defined in claim 7, wherein the processing circuitry of each of the plurality of electronic control devices determines whether an abnormality exists in the operation instruction.

9. The vehicle control system as defined in claim 7, further comprising:
an in-vehicle network to connect the vehicle integrated control device and each of the plurality of electronic control devices, and
a network communication device to intervene between the in-vehicle network and each of the plurality of electronic control devices, wherein
the network communication device includes processing circuitry to determine whether an abnormality exists in the operation instruction.

10. The vehicle control system as defined in claim 9, wherein the processing circuitry of the network communication device determines a factor of an abnormality when the abnormality is detected in the operation instruction generated in the current control period, and selects the prediction control value generated in the preceding control period to be used in control over the actuator in the current control period in accordance with the factor of the abnormality.

11. A vehicle integrated control device in a vehicle control system of a vehicle, the vehicle having mounted thereon a plurality of electronic control devices to each control an actuator, and a vehicle integrated control device to control the plurality of electronic control devices, the vehicle integrated control device comprising:
processing circuitry to, during each of a plurality of successive control periods,
calculate a control target value to control the plurality of electronic control devices during the current control period based on a present state of the vehicle, and on a target trajectory generated based on a scheduled travelling route,
estimate a future state of the vehicle during the next control period, and calculate a prediction control value to control the plurality of electronic control devices during the next control period based on the state of the vehicle estimated and the target trajectory, and
acquire the control target value and the prediction control value, to generate an operation instruction corresponding to the current control period to be transmitted to each of the plurality of electronic control devices based on the control target value, generate a prediction control instruction corresponding to the next control period to be transmitted to each of the plurality of electronic control devices based on the prediction control value, generate an instruction signal including the operation instruction corresponding to the current control period and the prediction control instruction corresponding to the next control period,
wherein one of the prediction control instruction included in the instruction signal generated during the preceding control period, and the control instruction included in the instruction signal generated during the current control period, is selectively used by at least one of the plurality of electronic control devices to control the actuator during the current control period.

12. An electronic control device that is included a vehicle control system of a vehicle, the vehicle having mounted thereon a plurality of electronic control devices to each control an actuator and a vehicle integrated control device to control the plurality of electronic control devices, the electronic control device comprising
processing circuitry to, during each of a plurality of successive control periods,
acquire, from the vehicle integrated control device,
an instruction signal including an operation instruction generated based on a control target value to control the actuator during the current control period, the control target value being calculated during the current control period based on a present state of the vehicle, and on a target trajectory generated based on a scheduled travelling route of the vehicle, and
a prediction control instruction generated during the current control period to control the actuator during the next control period based on a prediction control value calculated based on an estimated future state of the vehicle in the next control period, and on the target trajectory; and
selectively control the actuator during the current control period based on one of: the operation instruction generated in the current control period, and the prediction control instruction generated in the preceding control period.

13. A network communication device included in a vehicle control system of a vehicle, the vehicle having mounted thereon a plurality of electronic control devices to each control an actuator, a vehicle integrated control device to control the plurality of electronic control devices, a network communication device to intervene between an in-vehicle network to connect the vehicle integrated control device and each of the plurality of electronic control devices, and each of the plurality of electronic control devices, the network communication device comprising
processing circuitry to, during each of a plurality of successive control periods,
acquire, from the vehicle integrated control device, an instruction signal including
an operation instruction generated based on a control target value to control the actuator during the current control period, the control target value being calculated based on a present state of the vehicle, and on a target trajectory generated based on a scheduled travelling route of the vehicle, and
a prediction control instruction generated during the current control period to control the actuator during the next control period based on a prediction control value calculated based on an estimated state of the vehicle in a future time while the vehicle is traveling along the target trajectory during the given trip, and on the target trajectory; and
determine whether an abnormality exists in the operation instruction,
wherein existence of the abnormality is determinative of which of the following is used to control the actuator during the current control period
the operation instruction included in the instruction signal acquired during the current control period, and
the prediction control instruction included in the instruction signal acquired during the preceding control period.

14. A vehicle control method of a vehicle control system of a vehicle, the vehicle having mounted thereon a plurality of electronic control devices to each control an actuator and a vehicle integrated control device to control the plurality of electronic control devices, the vehicle control method comprising:
during each of a plurality of successive control periods,
calculating a control target value to control the plurality of electronic control devices during the current control period based on a present state of the vehicle, and on a target trajectory generated based on a scheduled travelling route of the vehicle;
estimating a future state of the vehicle in the next control period, and calculating a prediction control value to control the plurality of electronic control devices during the next control period based on the state of the vehicle estimated, and on the target trajectory; and
acquiring the control target value and the prediction control value, generating an operation instruction corresponding to the current control period to be transmitted to each of the plurality of electronic control devices based on the control target value, generating a prediction control instruction corresponding to the next control period to be transmitted to each of the plurality of electronic control devices based on the prediction control value, and generating an instruction signal including the operation instruction corresponding to the current control period and the prediction control instruction corresponding to the next control period, wherein
the actuator is selectively controlled during the current control period based on one of: the operation instruction included in the instruction signal generated in the current control period, and the prediction control instruction included in the instruction signal generated in the preceding control period.

15. A non-transitory computer readable medium storing a vehicle control program of a vehicle control system of a vehicle, the vehicle having mounted thereon a plurality of electronic control devices to each control an actuator, and a vehicle integrated control device to control the plurality of electronic control devices, the vehicle control program making a computer perform:
  during each of a plurality of successive control periods,
    a control target value operation process to calculate a control target value to control the plurality of electronic control devices during the current control period based on a present state of the vehicle, and on a target trajectory generated based on a scheduled travelling route of the vehicle;
  a prediction control value operation process to estimate a future state of the vehicle in the next control period, and calculate a prediction control value to control the plurality of electronic control devices during the next control period based on the state of the vehicle estimated and on the target trajectory;
  an instruction signal generation process to acquire the control target value and the prediction control value, to generate an operation instruction corresponding to the current control period to be transmitted to each of the plurality of electronic control devices based on the control target value, to generate a prediction control instruction corresponding to the next control period to be transmitted to each of the plurality of electronic control devices based on the prediction control value, and to generate an instruction signal including the operation instruction corresponding to the current control period and the prediction control instruction corresponding to the next control period; and
  an actuator control process to selectively control the actuator during the current control period based on one of: the operation instruction included in the instruction signal generated in the current control period, and the prediction control instruction included in the instruction signal generated in the preceding control period.

\* \* \* \* \*